(12) United States Patent
Acton et al.

(10) Patent No.: US 10,313,503 B2
(45) Date of Patent: Jun. 4, 2019

(54) TECHNIQUES TO RECONFIGURE MESSAGING CLIENTS DURING CONTACT INFORMATION CHANGES

(71) Applicant: WhatsApp Inc., Mountain View, CA (US)

(72) Inventors: Brian Acton, Santa Clara, CA (US); Jan Koum, Santa Clara, CA (US); Randall Sarafa, San Francisco, CA (US)

(73) Assignee: WHATSAPP INC., Menlo Park, CA (US)

( * ) Notice: Subject to any disclaimer, the term of this patent is extended or adjusted under 35 U.S.C. 154(b) by 354 days.

(21) Appl. No.: 15/349,947

(22) Filed: Nov. 11, 2016

(65) Prior Publication Data
US 2018/0139314 A1    May 17, 2018

(51) Int. Cl.
| | |
|---|---|
| *G06F 15/16* | (2006.01) |
| *H04M 1/2745* | (2006.01) |
| *H04M 7/00* | (2006.01) |
| *H04W 4/12* | (2009.01) |
| *H04L 12/58* | (2006.01) |
| *H04M 1/725* | (2006.01) |
| *H04M 3/42* | (2006.01) |

(52) U.S. Cl.
CPC ...... *H04M 1/274516* (2013.01); *H04L 51/16* (2013.01); *H04L 51/38* (2013.01); *H04M 1/72547* (2013.01); *H04M 3/42042* (2013.01); *H04M 3/42178* (2013.01); *H04M 7/0042* (2013.01); *H04M 7/0045* (2013.01); *H04W 4/12* (2013.01); *H04M 2203/554* (2013.01)

(58) Field of Classification Search
CPC ....... H04M 1/274516; H04M 3/42042; H04M 3/42178; H04M 7/0045; H04M 1/72547; H04M 7/0042; H04M 2203/554; H04L 51/16; H04L 51/38; H04W 4/12
See application file for complete search history.

(56) References Cited

U.S. PATENT DOCUMENTS

| | | | | |
|---|---|---|---|---|
| 9,800,537 | B2 * | 10/2017 | Talwar | ...... H04W 4/14 |
| 2009/0221307 | A1 * | 9/2009 | Wolak | ...... G06Q 10/10 |
| | | | | 455/466 |
| 2009/0240657 | A1 * | 9/2009 | Grigsby | ...... G06Q 10/10 |
| 2015/0332062 | A1 * | 11/2015 | McReynolds | ...... H04L 51/28 |
| | | | | 726/28 |

(Continued)

*Primary Examiner* — John B Walsh

(57) ABSTRACT

Techniques to reconfigure messaging clients during contact information changes are described. In one embodiment, an apparatus may comprise a messaging component operative to receive a contact phone number update at a messaging client on the client device from a messaging system, the contact phone number update associated with a contact with the messaging client, the contact phone number update comprising a previous phone number and an updated phone number; determine an existing message thread for the messaging client identified based on the previous phone number; and send a user message to the contact via the messaging system using the updated phone number as a destination address; and a user interface component operative to display a contact phone number change notification in the existing message thread; and receive the user message for the contact. Other embodiments are described and claimed.

20 Claims, 20 Drawing Sheets

Contact Update System 100

(56) References Cited

U.S. PATENT DOCUMENTS

2016/0277417 A1* 9/2016 Li .......................... H04L 51/28
2017/0126872 A1* 5/2017 Cha ................. H04M 1/274508
2017/0163781 A1* 6/2017 Seshan ................ G06F 3/04817

* cited by examiner

1000

Receive a contact phone number update at a messaging client on a client device from a messaging system, the contact phone number update associated with a contact with the messaging client, the contact phone number update comprising a previous phone number and an updated phone number.
*1002*

Determine an existing message thread for the messaging client identified based on the previous phone number.
*1004*

Display a contact phone number change notification in the existing message thread.
*1006*

Receive a user message for the contact.
*1008*

Send the user message to the contact via the messaging system using the updated phone number as a destination address.
*1010*

*FIG. 10*

TECHNIQUES TO RECONFIGURE MESSAGING CLIENTS DURING CONTACT INFORMATION CHANGES

BACKGROUND

Internet users may engage in communication with each other, such as through the exchange of messages. Users may compose messages to each other on computing devices and send them to each other, such as via an intermediary messaging platform. Users may have accounts registered with the intermediary messaging platform establishing an address at which they may be contacted. The users may compose and submit their messages using these addresses. Users may receive their correspondence at their address by accessing the intermediary messaging platform with their address and a password associated with their account.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to reconfigure messaging clients during contact information changes. Some embodiments are particularly directed to techniques to reconfigure messaging clients during contact information changes for messaging clients that use the contact information to identify the messaging partner in a message thread. In one embodiment, for example, an apparatus may comprise a messaging component operative to receive a contact phone number update at a messaging client on the client device from a messaging system, the contact phone number update associated with a contact with the messaging client, the contact phone number update comprising a previous phone number and an updated phone number; determine an existing message thread for the messaging client identified based on the previous phone number; and send a user message to the contact via the messaging system using the updated phone number as a destination address; and a user interface component operative to display a contact phone number change notification in the existing message thread; and receive the user message for the contact. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10 illustrates an embodiment of a logic flow for the system of FIG. 1.

DETAILED DESCRIPTION

Figure 1:
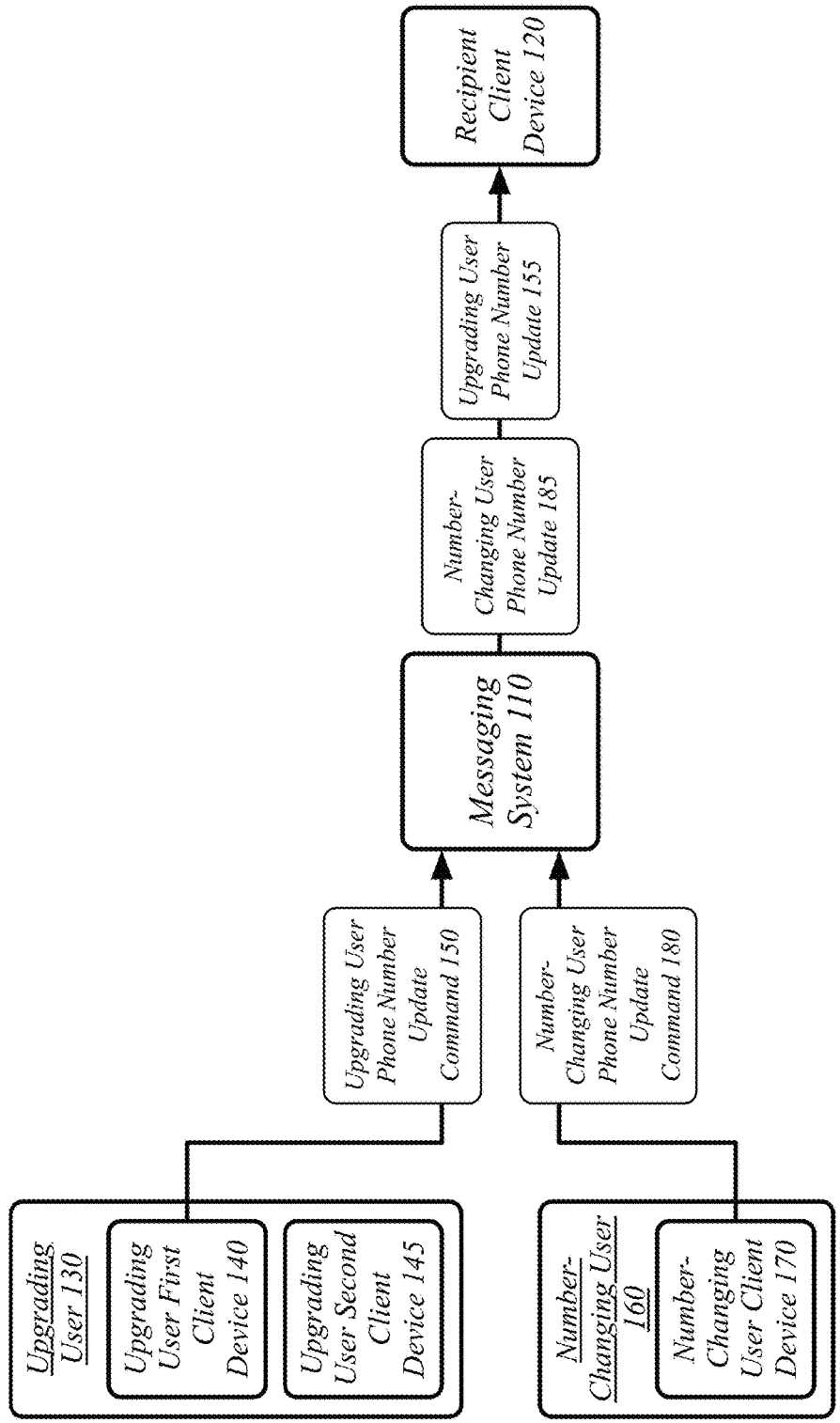
FIG. 1 illustrates an embodiment of a contact update system.

A messaging system may be configured for device-to-device messaging communication, in which a user is uniquely or primarily associated with a single particular client device. Access to the messaging system may be provided via messaging clients on smartphone devices. As smartphone devices may be associated with a unique phone number, the phone numbers of the devices executing on the messaging clients may be used to identify the users of the messaging system.

The use of phone numbers to identify users for messaging may be particularly appropriate where end-to-end encryption is used as the end-to-end encryption may result in outgoing messages from one device being encrypted for one particular destination device. As such, tying a user's identity with the messaging system to a phone number may correspond to the structure of message exchanges by the messaging system. Further, tying a user's identity to their phone number may be a convenience to users in finding friends, family, and other contacts with which to message via the messaging system. The messaging system may leverage the contents of an address book on the client device to discover phone numbers for existing phone contacts for a user and add them as messaging contacts with the messaging system.

However, users may sometimes change phone numbers. In some cases, a user may keep their smartphone device and change the phone number assigned to that smartphone device, such as when purchasing a new subscriber identity module (SIM) card. In other cases, a user may upgrade their smartphone device and have a different phone numbers assigned to that upgraded smartphone device. In either case, this may result in the association in a messaging system between a user and their phone number to break.

As such, the messaging system may accommodate changing the phone number associated with a user. The messaging system may distribute a contact phone number update to messaging contacts for a user changing their phone number. The messaging system may use various techniques to communicate this change to the changing user's contacts and to ease the transition between phone numbers for the contacts. As a result, the embodiments can improve the flexibility of the messaging system and the messaging experience for users of the messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a contact update system 100. In one embodiment, the contact update system 100 may comprise a computer-implemented system having software applications comprising one or more components. Although the contact update system 100 shown in FIG. 1 has a limited number of elements in a certain topology, it may be appreciated that the contact update system 100 may include more or less elements in alternate topologies as desired for a given implementation.

A messaging system 110 may be generally arranged to enable messaging communication. For instance, a communication systems may receive, store, and deliver messages. A messaging system 110 may act as any sort of communications intermediary, such as for messaging, VoIP, online gaming, or other intermediated online interaction between multiple client devices. A messaging system 110 may store messages while messaging clients, such as may execute on client devices are offline and deliver the messages once the communications applications are available. A messaging system 110 may empower the engagement and performance of other communication tasks, such as audio and/or video calls.

A plurality of client devices may operate as part of the contact update system 100, sending and receiving messages and otherwise communicating between each other. The client devices may execute messaging clients for the messaging system 110, wherein each of the client devices and their respective messaging clients are associated with a particular user of the messaging system 110. In some embodiments, the client devices may be cellular devices such as smartphones and may be identified to the communications system based on a phone number associated with each of the client devices. In some embodiments, the client devices may be identified to the communications system based on a user account registered with the communications system—and potentially a social networking system that comprises or is associated with the communications system—and logged into from the messaging clients executing on the client devices. While in some embodiments the client devices may comprise cellular devices, in other embodiments one or more of the client devices may include personal computers, tablet devices, any other form of computing device without limitation. Personal computers and other devices may access a messaging system 110 using web browser accessing a web server, for instance. In some embodiments, access to the messaging system 110 using a web browser may comprise accessing a messaging client on a smartphone client device. In some embodiments, the messaging client on a smartphone client device may be the source of truth regarding user state with the messaging system 110.

Messages exchanged by the messaging system 110 may be organized by threads. A thread may correspond to a particular collection of messages, wherein at any particular point in time the thread is associated with a particular group of users, such as a pair of users in a one-on-one thread or three or more users in a group thread.

An upgrading user 130 may transition from an upgrading user first client device 140 to an upgrading user second client device 145. This may be an upgrade for the user to a newer device. The user may have decided to receive a new phone number with their new device. The user may use a messaging client to send an upgrading user phone number update command 150 to the messaging system 110 from their first client device 140, the device with the old phone number on which the messaging client was previously used. The use of the first client device 140 to send the update command 150 may serve to authenticate the legitimacy of the update command 150. The messaging system 110 may generate an upgrading user phone number update 155 and send the upgrading user phone number update 155 to a recipient client device 120. The upgrading user phone number update 155 may be operative to configure the recipient client device 120 with the new phone number for the upgrading user 130.

A number-changing user 160 may change the phone number used with a number-changing user client device 170. This may be as a result of a move, from the purchase of a new SIM card, or any other reason. The user may have decided to receive a new phone number with their new device. The user may use a messaging client to send an number-changing user phone number update command 180 to the messaging system 110 from their client device 170. The use of their client device 170 to send the update command 180 may serve to authenticate the legitimacy of the update command 180. The messaging system 110 may generate an number-changing user phone number update 185 and send the number-changing user phone number update 185 to a recipient client device 120. The number-changing user phone number update 185 may be operative to configure the recipient client device 120 with the new phone number for the number-changing user 160.

The client devices may communicate using wireless transmissions to exchange network traffic. Exchanging network traffic, such as may be included in the exchange of messaging transactions, may comprise sending and receiving network traffic via a network interface controller (NIC). A NIC comprises a hardware component connecting a computer device, such as each of client devices, to a computer network. The NIC may be associated with a software network interface empowering software applications to access and use the NIC. Network traffic may be received over the computer network as signals sent over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Contact update system 100 may include an authorization server (or other suitable component(s)) that allows users to opt in to or opt out of having their actions logged by contact update system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of contact update system 100 and other elements of a messaging system through blocking, data hashing, anonymization, or other suitable techniques as appropriate. In some embodiments, a user may be presented with information regarding what may be collected and how that information may be used, such as informing the user that collected information may be anonymized prior to analysis.

Figure 2:
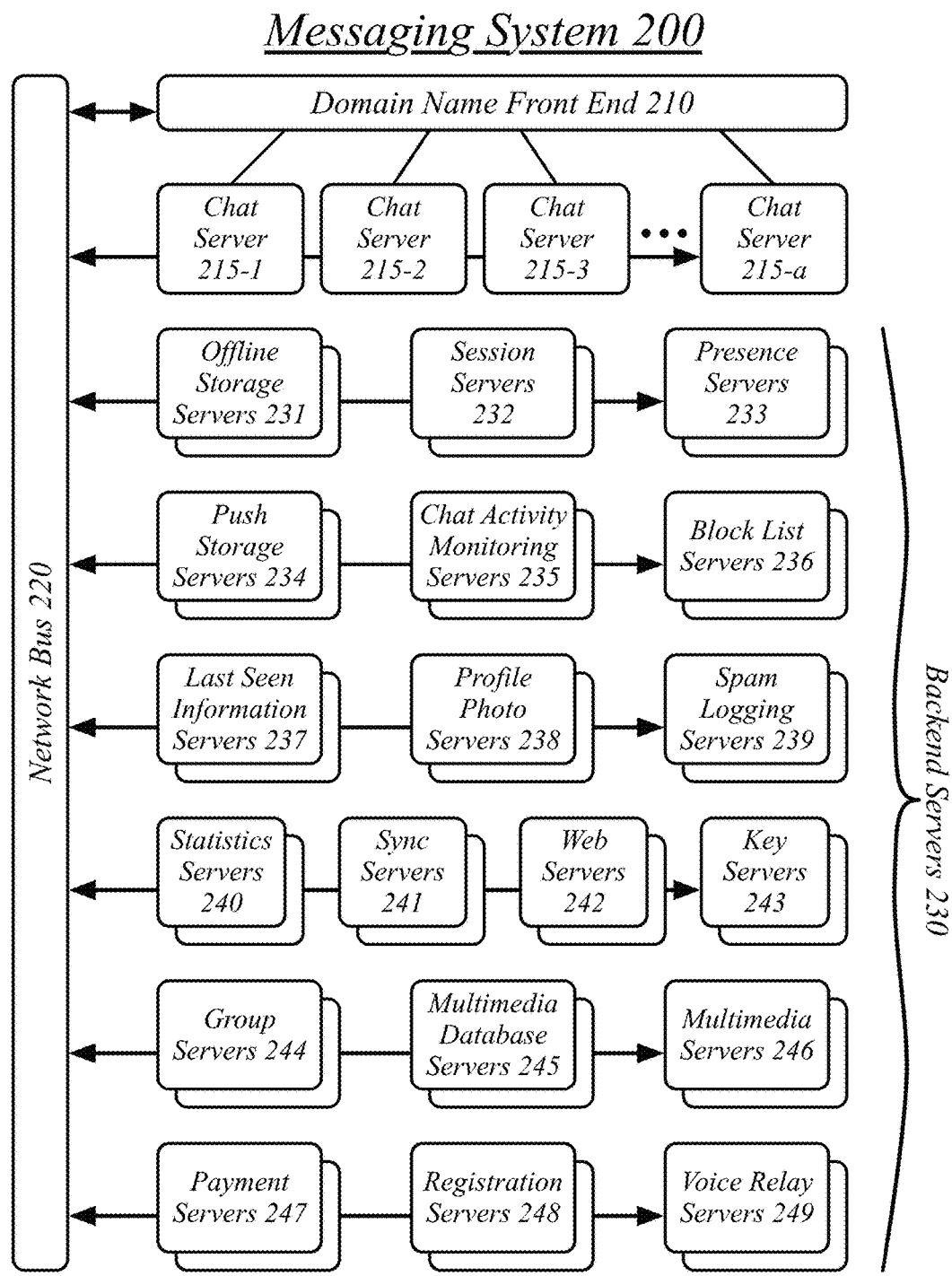
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the contact update system 100 with the operations of the contact update system 100 comprising a portion of the overall operations of the messaging system 200. The illustrated embodiment of the messaging system 200 may particularly correspond to the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for sending and receiving user-to-user messaging updates such as chat messages. Incoming connections may be assigned to the chat servers 215 by the domain name front end 210 based on workload balancing. Where a user engages in a VoIP interaction, a chat server may act as a relay initiation system to authorize access to the voice relay servers 249 and to provide information to the client devices for the selection of a particular relay system within the plurality of voice relay servers 249.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and send the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from sending messages to that user. Alternatively or additionally, the one or more block list servers 236 may maintain user-specific outgoing-block lists indicating for each user the one or more other users that that user is forbidden from sending messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be sent by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls. The one or more voice relay servers 249 may comprise a plurality of relay systems, such as may be geographically distributed into different geographic service areas.

Figure 3:
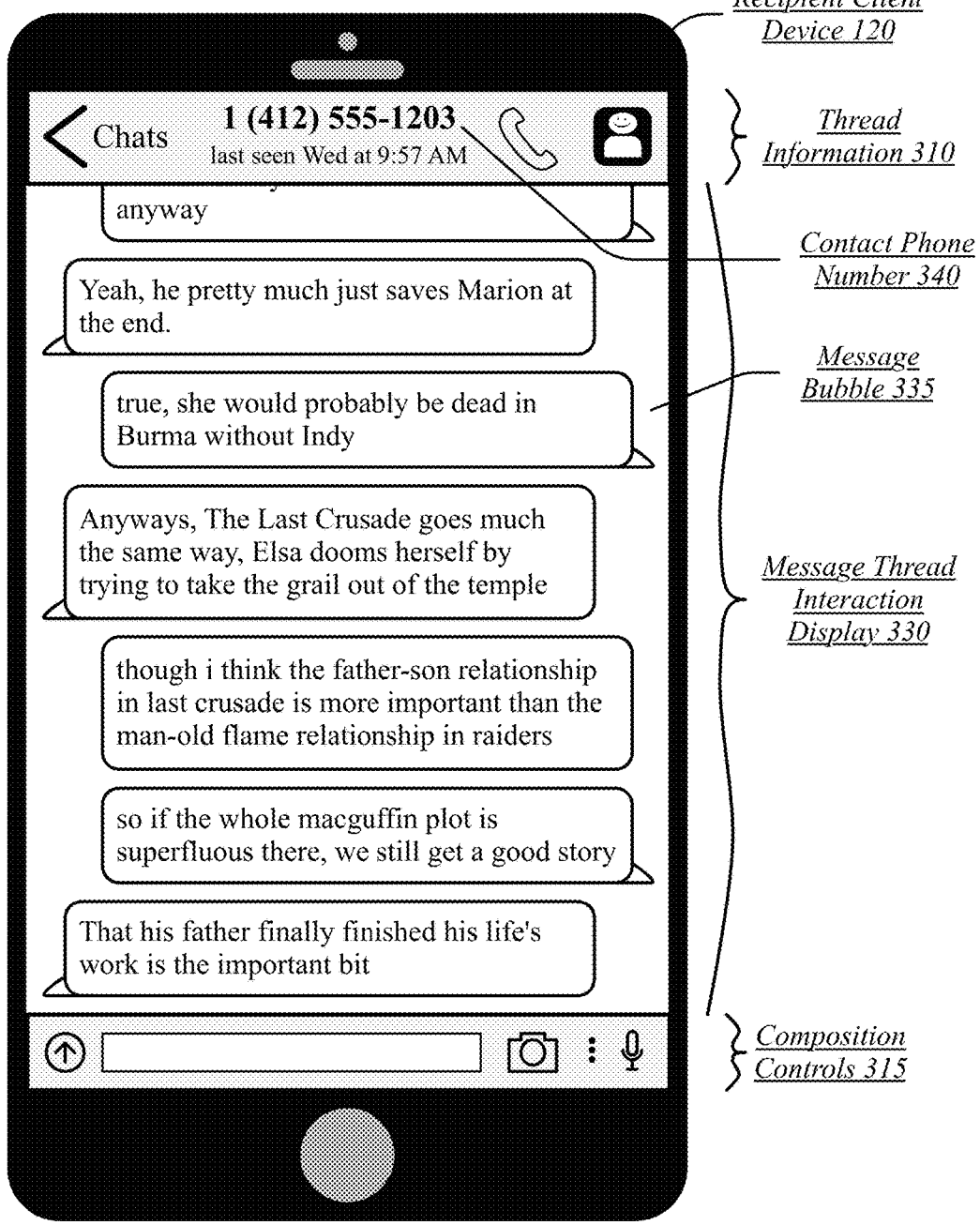
FIG. 3 illustrates an embodiment of a user interface for a messaging client.

FIG. 3 illustrates an embodiment of a user interface 300 for a messaging client. The user interface 300 may be displayed on a client device 120.

The user interface 300 may comprise a user interface for a one-on-one message thread. At least a portion of the message exchange for the message thread may be displayed in a message thread interaction display 330. A message thread interaction display 330 may comprise a display of one or more messages exchanged by the users of the one-on-one message thread. The features discussed with regards to a on-one message thread may also be applied to group threads.

Each of the one or more messages may be represented by a particular message bubble, such as message bubble 335. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from a background of a message thread interaction display. A message bubble may have a distinctly-colored border, such as a black outline as depicted, or may have a border defined by the interface between differing colors of the message bubble and the background. In some embodiments, the color or colors of either or both the message bubbles and the background may be customized and configured by users of the messaging system 110.

The user interface 300 may include a display of thread information 310. The thread information 310 may comprise a listing of one or more other users involved in the thread. A display of the one or more other users may use the name of a user, such as a full name, short name, or other name registered as the name for use with a particular user for messaging and/or social-networking interactions. A display of the one or more other users may use an avatar, profile picture, or other visual representation of the one or more other users. A display of the one or more other users may comprise a contact phone number 340 for a user engaged with in the message thread. The contact phone number 340 may comprise the identifier for the contact with the messaging system 110.

The user interface 300 for a message thread may include composition controls 315 that are persistently visible during the display of a message thread. Many, most, or nearly all of the composition controls 340 may empower access to further user interface controls for the performance of various tasks, such as text entry, media selection, emoji selection, camera use, a social approval icon, etc.

When a message is received via the messaging system 110, the contact phone number 340 of the sending user may be used to identify the message thread for the storage and display of the message. A message package used for the transmission of a message may comprise a phone number field, the phone number field comprising the phone number of the sending user. The contact phone number 340 may then be used to retrieve the message thread for the conversation with that user.

Figure 4A:
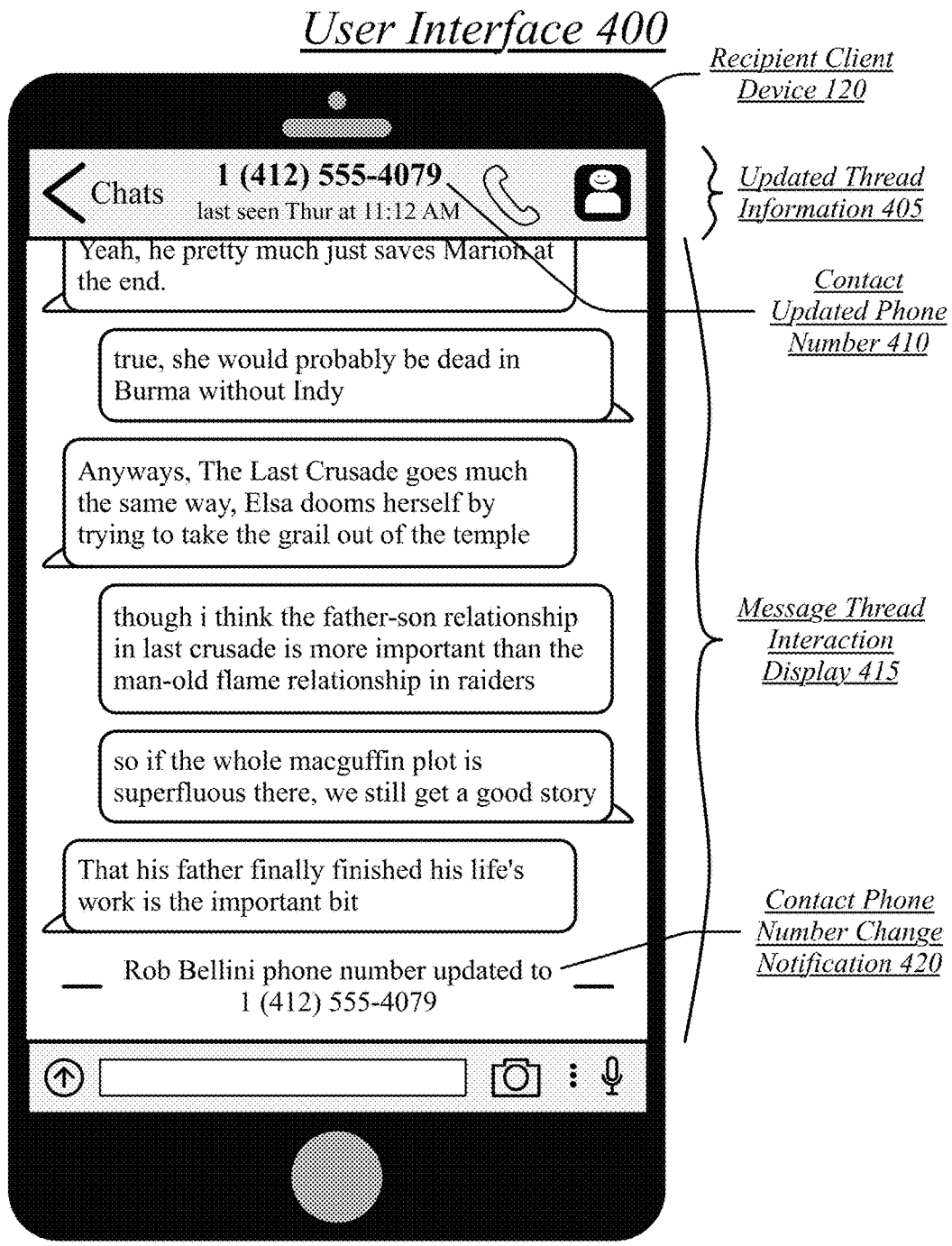
FIG. 4A illustrates an embodiment of a user interface displaying a contact phone number change notification.

FIG. 4A illustrates an embodiment of a user interface 400 displaying a contact phone number change notification 420. FIG. 4A may illustrate an embodiment in which an existing message thread is reconfigured to use an updated phone number for a contact.

The thread information for a thread may be reconfigured to updated thread information 405. The updated thread information 405 may comprise a display of a contact updated phone number 410, the contact updated phone number 410 the replacement phone number for the messaging contact with which the message thread is associated. The updated thread information 405 may comprise a display of the last-seen time for the contact. The last-seen time may be based on the more recent of the contact being available to the messaging system 110 on a client device at either of the previous phone number or the updated phone number.

An updated message thread interaction display 415 may include a contact phone number change notification 420. The contact phone number change notification 420 may comprise a display of update information for the contact with the updated phone number. The contact phone number change notification 420 may comprise the name of the contact. The contact phone number change notification 420 may comprise the updated phone number for the contact. The contact phone number change notification 420 may generally comprise a display of text communicating the update in the phone number for the contact.

Figure 4B:
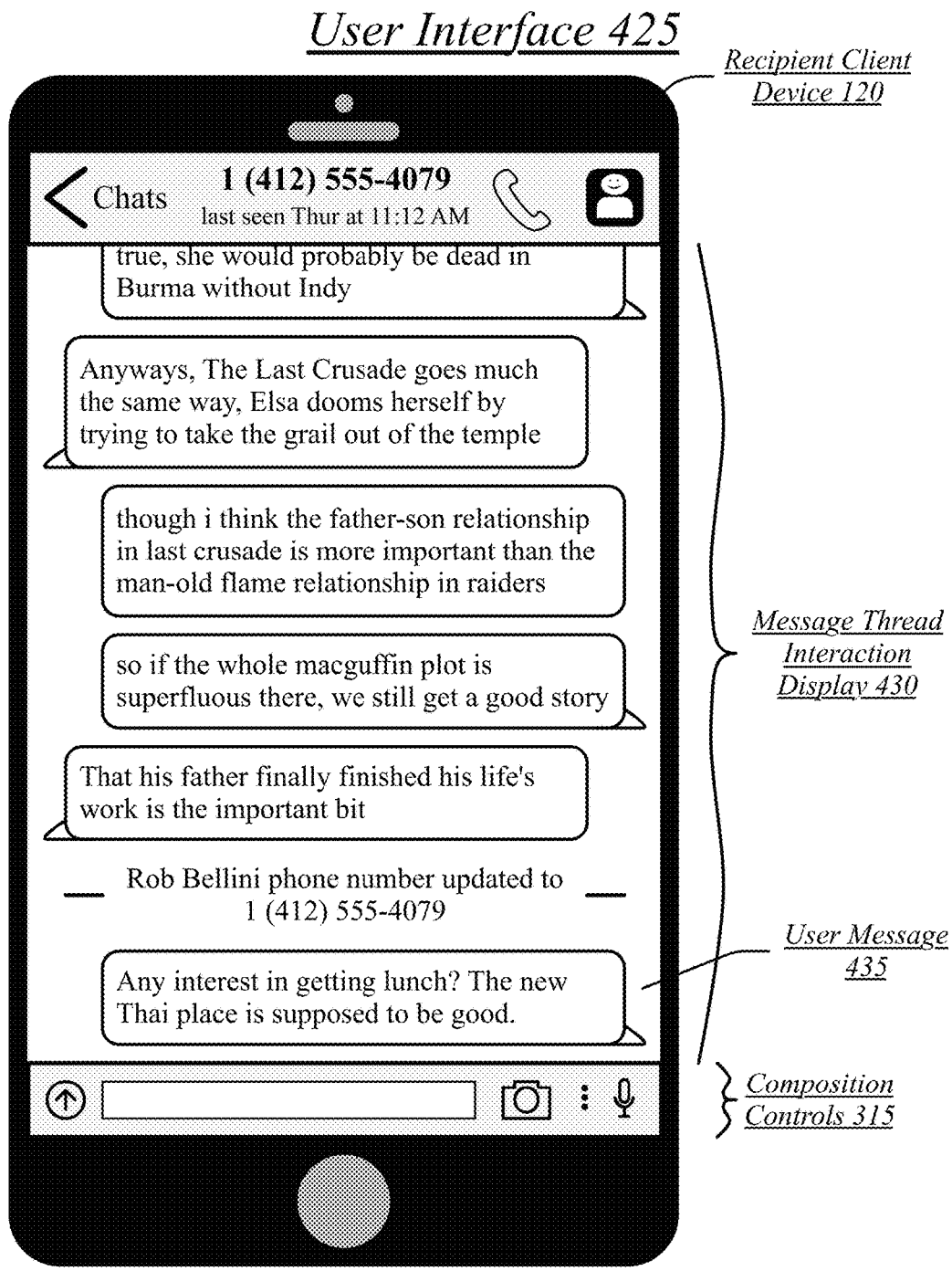
FIG. 4B illustrates an embodiment of a user interface displaying a user message sent to an updated phone number in an existing message thread for a previous phone number.

FIG. 4B illustrates an embodiment of a user interface 425 displaying a user message 435 sent to an updated phone number in an existing message thread previously associated with a previous phone number. FIG. 4B may correspond to the embodiment of FIG. 4A at a later time.

A user message 435 may be composed by the user of the recipient client device 120. The user of the recipient client device 120 may use the composition controls 315 to compose the message, such as by using controls instantiated based on selection of text entry, media capture or selection, or other controls as part of the composition controls 315.

The messaging client on the recipient client device 120 may send the user message 435 to the contact associated with the message thread via the messaging system 110. The messaging client may address the user message 435 to the updated phone number for the contact despite the existing message thread having been previously associated with the previous phone number and the contact having been previously identified by the previous phone number. The message thread interaction display 430 may also be updated to display the user message 435 in the existing message thread.

Figure 4C:
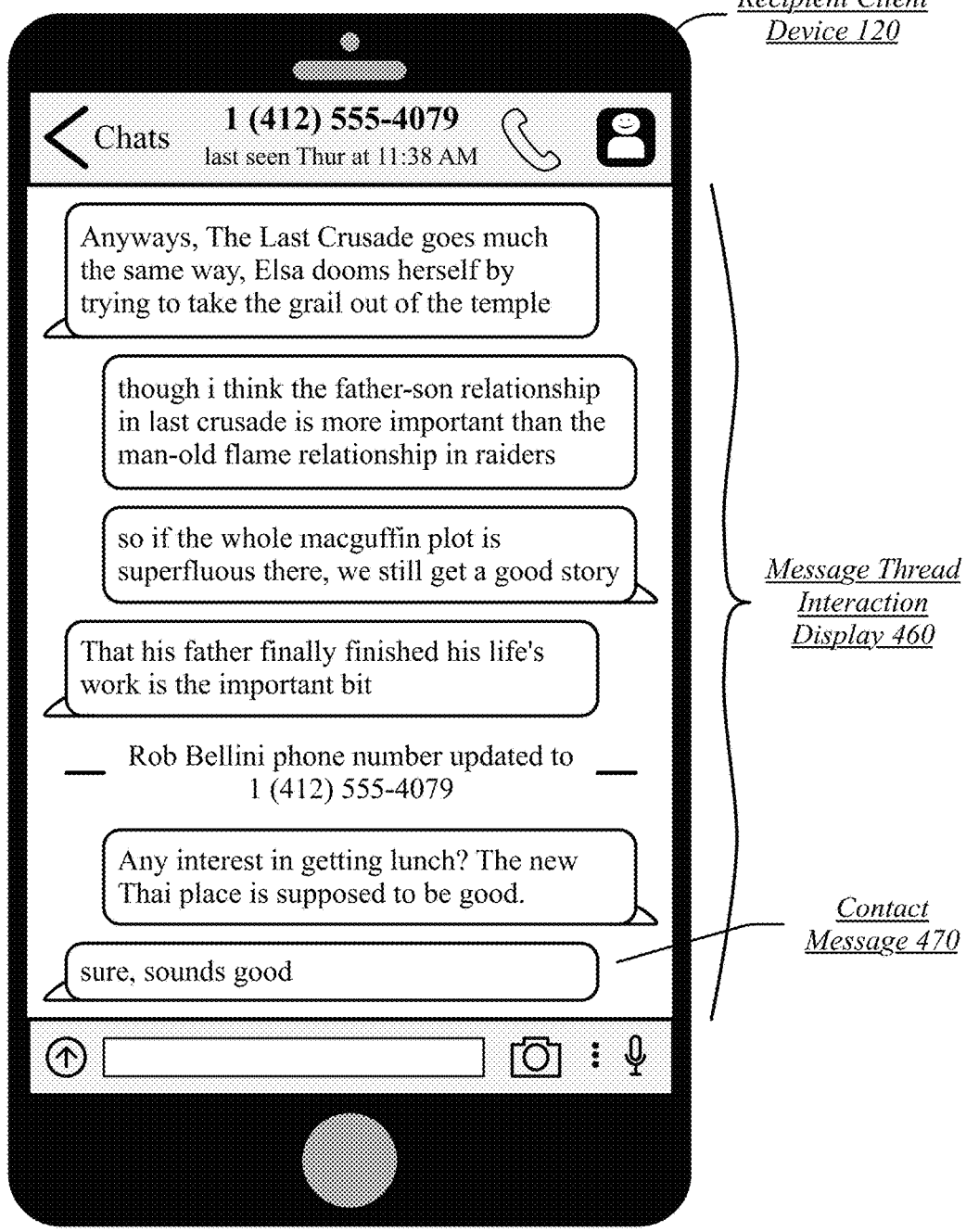
FIG. 4C illustrates an embodiment of a user interface displaying a contact message from an updated phone number in an existing message thread for a previous phone number.

FIG. 4C illustrates an embodiment of a user interface 450 displaying a contact message 470 from an updated phone number in an existing message thread for a previous phone number. FIG. 4C may correspond to the embodiment of FIG. 4B at a later time.

A contact message 470 may be composed by the user with the updated phone number and sent via the messaging system 110 to the recipient client device 120. The contact message 470 may be composed on and sent from a client device assigned the updated phone number.

The messaging client on the recipient client device 120 may receive the contact message 470 from the messaging system 110. The messaging client may identify the existing message thread for the display of the contact message 470 based on the updated phone number and the association between the updated phone number and the existing message thread for the contact. The messaging client may add the contact message 470 to the existing message thread for display to the user in a message thread interaction display 460. The messaging client may notify the user of the recipient client device 120 that the existing message thread has been updated and that a new message is available.

Figure 5A:
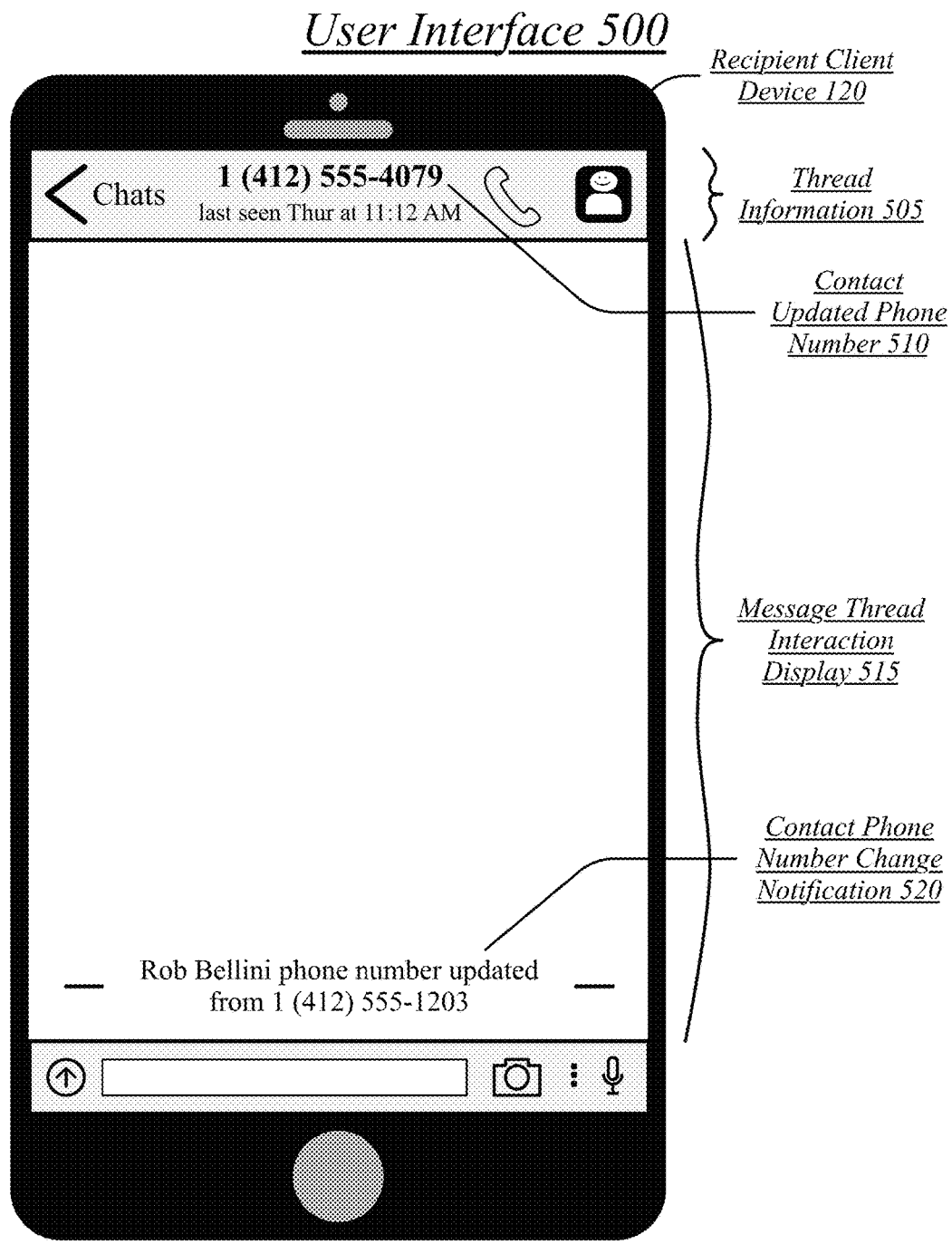
FIG. 5A illustrates an embodiment of a user interface for a replacement message thread for an updated phone number.

FIG. 5A illustrates an embodiment of a user interface 500 for a replacement message thread for an updated phone number. FIG. 5A may illustrate an embodiment in which an replacement message thread is created for use with an updated phone number for a contact.

A display of thread information 505 for the replacement message thread may be configured. The thread information 505 may include the contact updated phone number 510. The thread information 505 may comprise a display of the last-seen time for the contact. The last-seen time may be based on the more recent of the contact being available to the messaging system 110 on a client device at either of the previous phone number or the updated phone number.

An message thread interaction display 515 may include a contact phone number change notification 520. The contact phone number change notification 520 may comprise a display indicating that the replacement message thread is for the contact previously associated with the previous phone number. The contact phone number change notification 520 may comprise the name of the contact. The contact phone number change notification 520 may comprise the previous phone number for the contact. The contact phone number change notification 520 may generally comprise a display of text communicating the update in the phone number for the contact.

The message thread interaction display 515 for the replacement message thread may otherwise be empty to indicate that it is a replacement message thread. In some embodiments, the message thread interaction display 515 for the replacement message thread may be completely empty and not include the contact phone number change notification 520.

Figure 5B:
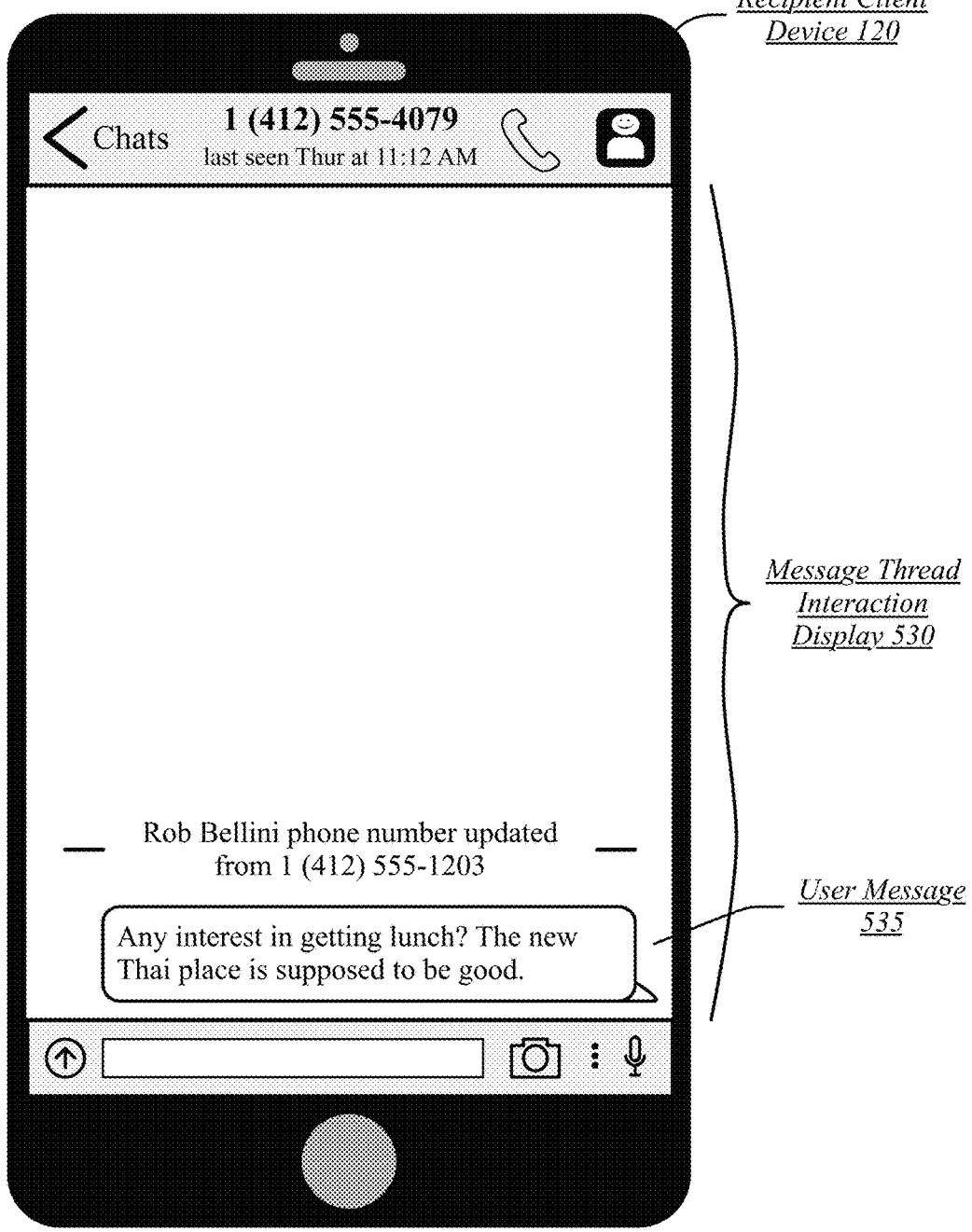
FIG. 5B illustrates an embodiment of a user interface for a replacement message thread displaying a user message sent to an updated phone number.

FIG. 5B illustrates an embodiment of a user interface 525 for a replacement message thread displaying a user message 535 sent to an updated phone number. FIG. 5B may correspond to the embodiment of FIG. 5A at a later time.

A user message 535 may be composed by the user of the recipient client device 120. The user of the recipient client device 120 may use the composition controls 315 to compose the message, such as by using controls instantiated based on selection of text entry, media capture or selection, or other controls as part of the composition controls 315.

The messaging client on the recipient client device 120 may send the user message 535 to the contact associated with the replacement message thread via the messaging system 110. The messaging client may address the user message 535 to the updated phone number for the contact based on the replacement message thread being associated with the updated phone number. The message thread interaction display 530 may also be updated to display the user message 535 in the replacement message thread.

Figure 5C:
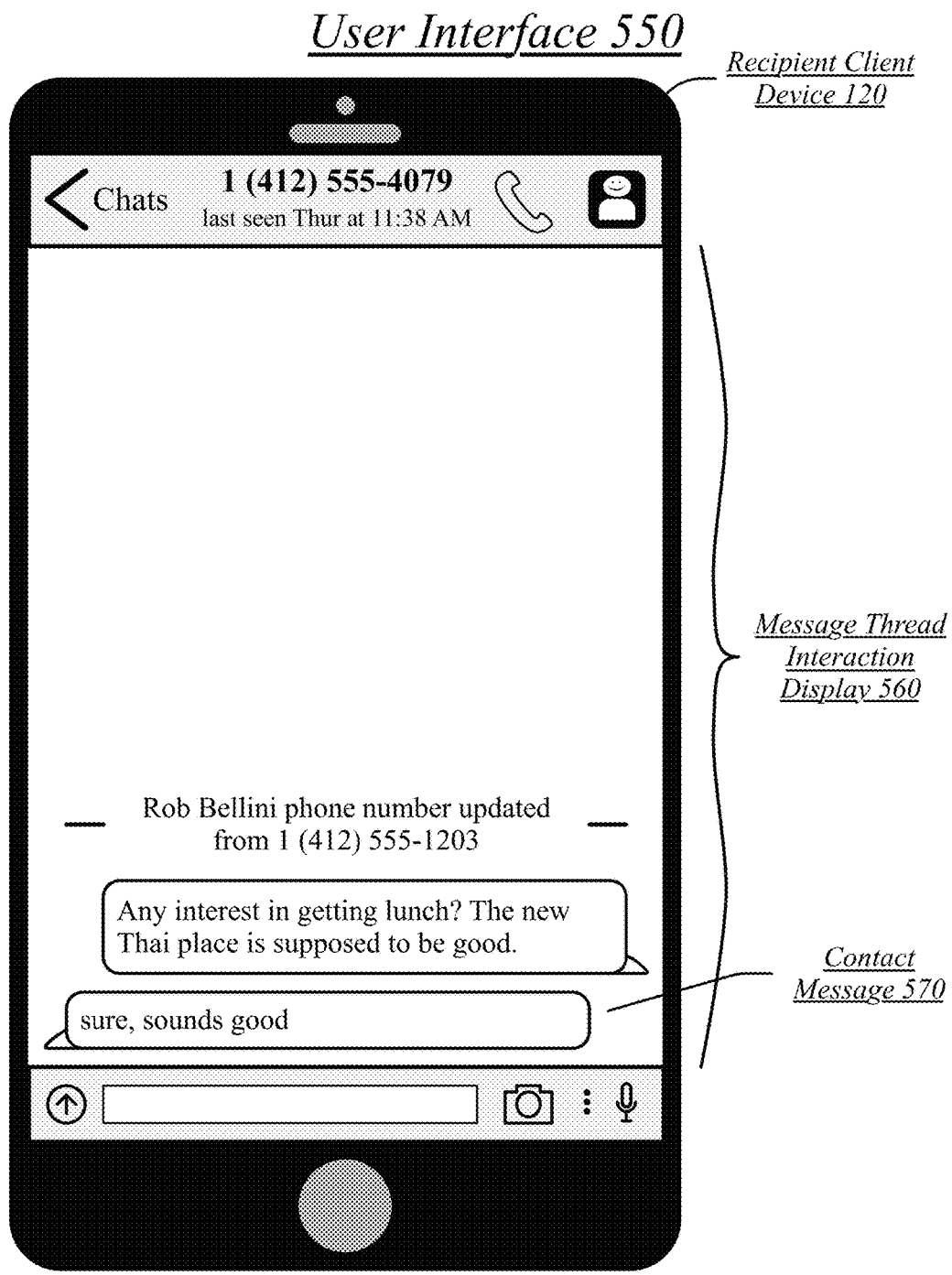
FIG. 5C illustrates an embodiment of a user interface for a replacement message thread displaying a contact message received from an updated phone number.

FIG. 5C illustrates an embodiment of a user interface 550 for a replacement message thread displaying a contact message 570 received from an updated phone number. FIG. 5C may correspond to the embodiment of FIG. 5B at a later time.

A contact message 570 may be composed by the user with the updated phone number and sent via the messaging system 110 to the recipient client device 120. The contact message 570 may be composed on and sent from a client device assigned the updated phone number.

The messaging client on the recipient client device 120 may receive the contact message 570 from the messaging system 110. The messaging client may identify the replacement message thread for the display of the contact message 570 based on the updated phone number and the association between the updated phone number and the replacement message thread for the contact. The messaging client may add the contact message 570 to the replacement message thread for display to the user in a message thread interaction display 560. The messaging client may notify the user of the recipient client device 120 that the replacement message thread has been updated and that a new message is available.

Figure 6A:
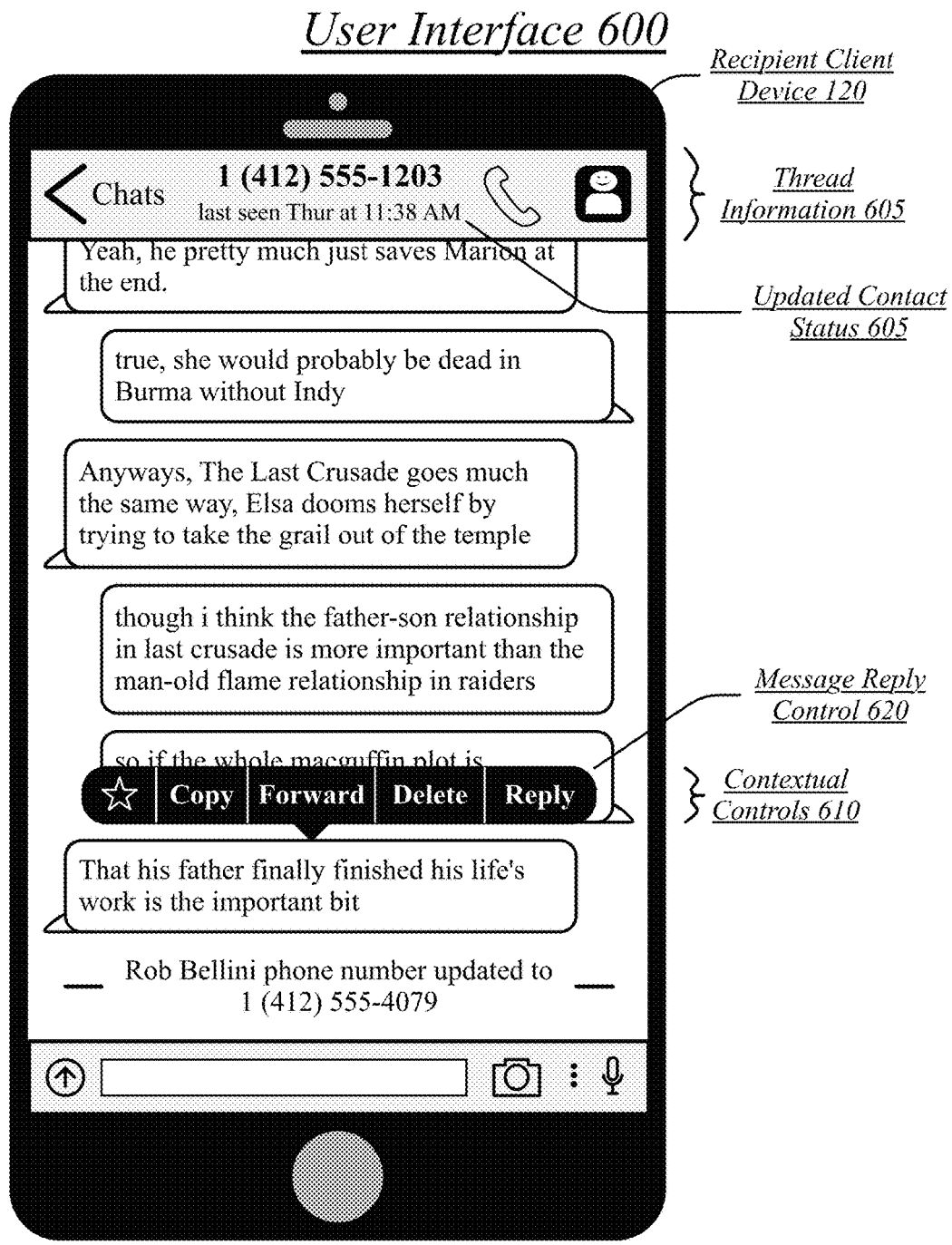
FIG. 6A illustrates an embodiment of a user interface displaying a message reply control in an existing message thread for a previous phone number.

FIG. 6A illustrates an embodiment of a user interface 600 displaying a message reply control 620 in an existing message thread for a previous phone number. FIG. 6A may illustrate an embodiment in which an replacement message thread is created for use with an updated phone number for a contact. FIG. 6A may illustrate the existing message thread remaining after the replacement message thread is created.

The thread information 605 for the existing thread may maintain and display updated thread information. The thread information 605 may comprise a display of a contact previous phone number that the existing message thread remains associated with. The thread information 605 may comprise a display of the last-seen time for the contact. In some embodiments, the last-seen time for an existing message thread may be based on the more recent of the contact being available to the messaging system 110 on a client device at either of the previous phone number or the updated phone number as an updated contact status 605 maintained even after the creation of a replacement message thread. In other embodiments, the last-seen time for an existing message thread may be based on the last time the contact was available to the messaging system 110 on a client device at the previous phone number, with which the existing message thread is still associated.

The selection of a message—such as through a touchscreen selection of the message bubble for the message—may instantiate contextual controls 610 associated with the message. The contextual controls may comprise a plurality of controls empowering the user to perform operations related to the selected message. The contextual controls 610 may include a favorite control empowering the user to mark the selected message as a favorite, as may be indicated by a star symbol. The contextual controls 610 may include a copy control empowering the user to copy the contents of the message to a clipboard for the messaging client and/or the operating system of the recipient client device 120. The contextual controls 610 may include a forward control empowering the user to forward the message to another user of the messaging system 110. The contextual controls 610 may include a delete control empowering the user to remove the selected message from the messaging client on the recipient client device 120. In some embodiments, the delete control may remove the selected message from the messaging client on other client devices, such as other client devices associated with the user of the recipient client device 120.

The contextual controls 610 may include a message reply control 620. The message reply control 620 may empower a user to reply to the selected message. In some embodiments, the message reply control 620 may be conditionally presented in existing message threads in which replies are no longer able to be sent due to the contact having an updated phone number. In other embodiments, the message reply control 620 may always be presented to empower a user to select an older message to which to reply. When selected in an existing message thread, the message reply control 620 may redirect a user to the replacement message thread for the contact for the composition of a reply to the selected message in the replacement message thread.

Figure 6B:
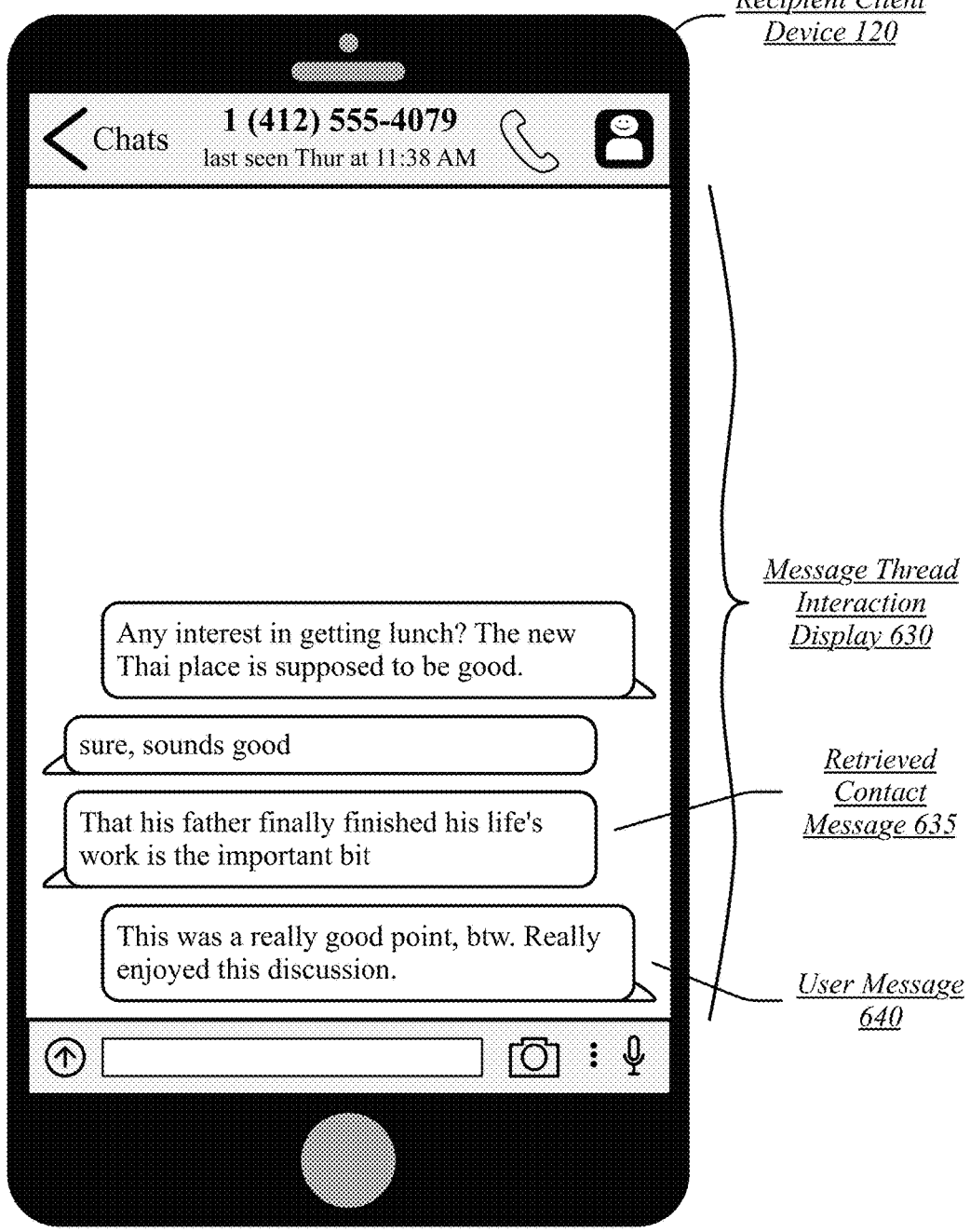
FIG. 6B illustrates an embodiment of a user interface displaying a retrieved contact message and a user message replying to the retrieved contact message in a replacement message thread.

FIG. 6B illustrates an embodiment of a user interface 625 displaying a retrieved contact message 635 and a user message 640 replying to the retrieved contact message in a replacement message thread. FIG. 6B may correspond to the embodiment of FIG. 6A at a later time after the selection of a message reply control 620 in the existing message thread.

The retrieved contact message 635 may be copied from the existing message thread to the replacement message thread in response to the selection of a message reply control 620 in the existing message thread. The retrieved contact message 635 may be displayed in the message thread interaction display 630 for the replacement message thread. The display of the retrieved contact message 635 in the message thread interaction display 630 may make it easier for the user of the recipient client device 120 to compose a reply to the retrieved contact message 635 by having it visible during the composition of the reply.

A user message 640 may be composed by the user of the recipient client device 120. The user of the recipient client device 120 may use the composition controls 315 to compose the message, such as by using controls instantiated based on selection of text entry, media capture or selection, or other controls as part of the composition controls 315. The user message 640 may be a reply to the retrieved contact message 635.

The messaging client on the recipient client device 120 may send the user message 640 to the contact associated with the replacement message thread via the messaging system 110. The messaging client may address the user message 640 to the updated phone number for the contact based on the replacement message thread being associated with the updated phone number. The message thread interaction display 630 may also be updated to display the user message 640 in the replacement message thread.

The user message 640 may be sent in a message package that includes metadata indicating that the user message 640 is a reply to the retrieved contact message 635 selected in the existing message thread previously used for communication with the contact at the previous phone number. This metadata may prompt the messaging client used by the contact to also display the retrieved contact message 635 in the message thread interaction display for the message thread in the messaging client for the contact. This may inform the contact as to the message of theirs that is being replied to by the user message 640.

Figure 7:
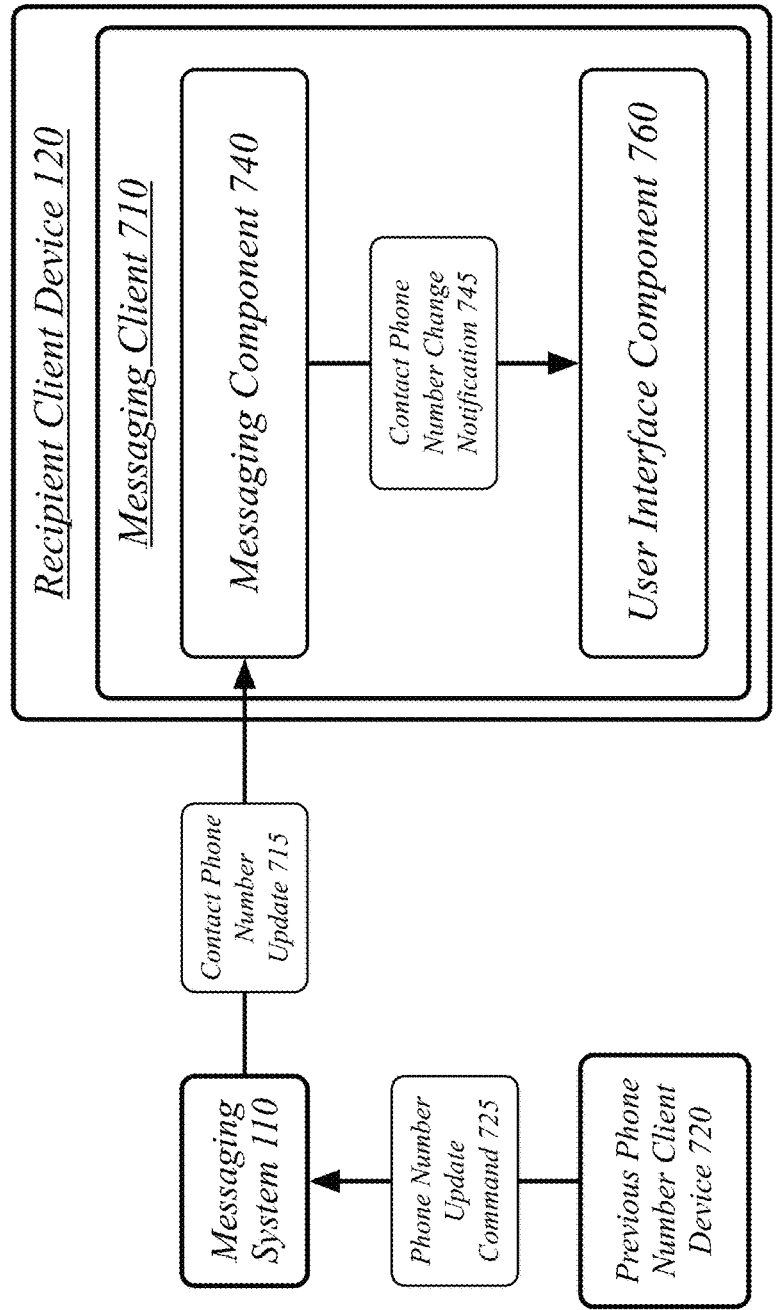
FIG. 7 illustrates an embodiment of a recipient client device receiving and processing a contact phone number update.

FIG. 7 illustrates an embodiment of a recipient client device 120 receiving and processing a contact phone number update 715.

A user changing their phone number may user their client device to inform the messaging system 110 that their phone number is changing and to request that the messaging system 110 notify their contacts—or people who have them as a contact—as to their updated phone number. The user may use a previous phone number client device 720, the previous phone number client device 720 the device that is either still or was previously assigned the previous phone number for the number-changing user. The use of the previous phone number client device 720 may attest to the contact update system 100—both the messaging system 110 and the recipient client device 120—that a phone number update command 725 changing a user's phone number is authentic and should be acted upon. It will be appreciated that, in some embodiments, phone number updates may be performed using peer-to-peer communication, using direct communication between client devices.

The messaging system 110 may receive a phone number update command 725 from a previous phone number client device 720, the previous phone number client device 720 the most-recent device associated with the previous phone number for the updating user. In some cases, the previous phone number client device 720 may still be associated with the previous phone number, such as where the updating user is changing their phone number as they change devices. In some cases, the previous phone number client device 720 may now be associated with the updated phone number, such as where the updating user is changing their phone number on an existing device.

The messaging client on the previous phone number client device 720 may encrypt, sign, or otherwise authenticate the phone number update command 725 using a secure token stored on the previous phone number client device 720. The messaging system 110 may verify that the phone number update command 725 is received from the user and should be acted upon based on the encryption, signing, or authentication by the previous phone number client device 720. The messaging system 110 may send a contact phone number update 715 to one or more devices, the contact phone number update 715 attesting to the messaging client 710 on the recipient client device 120 and other client devices that the update to the phone number for the updating user should be acted on, applied to one or more message threads, and/or have their number changed in an address book for the device.

The messaging client 710 on a recipient client device 120 may comprise a plurality of components. The plurality of components may comprise software components. The components of the messaging client 710 may include additional components to those described here and the operations of the messaging client 710 may be divided between components in different configurations in different embodiments.

The messaging client 710 may comprise a messaging component 740. The messaging component 740 may be generally arranged to perform the interactions between the messaging client 710 and the messaging system 110. The messaging component 740 may send network communication to and receive network communication from messaging servers of the messaging system 110.

The messaging client 710 may comprise a user interface component 760. The user interface component 760 may be generally arranged to present information to a user of the recipient client device 120 and receive user commands from the user of the recipient client device 120. The user interface component 760 may display visual information, output audio information, and otherwise present information to a user. The user interface component 760 may receive touch commands, text commands, voice commands, and any other sort of command for the operation of the messaging client 710.

The messaging component 740 may receive a contact phone number update 715 at the messaging client 710 on the recipient client device 120 from the messaging system 110. The contact phone number update 715 may be associated with a contact with the messaging client 710. The contact phone number update 715 may comprise a previous phone number and an updated phone number. The contact may be identified based on the previous phone number. The contact phone number update 715 may instruct the messaging client 710 to update the contact from using the previous phone number to using the updated phone number.

The messaging component 740 may determine an existing message thread for the messaging client 710 identified based on the previous phone number. The messaging client 710 may maintain a plurality of message thread, each associated with one or more contacts. The messaging component 740 may determine an existing message thread for the contact by performing a lookup based on the previous phone number. The messaging component 740 may provide a contact phone number change notification 745 to the user interface component 760 using inter-component communication. The user interface component 760 may then display the contact phone number change notification 745 in the existing message thread.

In some embodiments, the messaging client 710 may convenience the user of the recipient client device 120 by updating an address book for the recipient client device 120 based on the contact phone number update 715. The address book for the recipient client device 120 may be an address book maintained by an operating system for the recipient client device 120. In some cases, the address book for the recipient client device 120 may be an address book stored in a subscriber identity module (SIM) for the recipient client device 120. In some cases, the address book for the recipient client device 120 may be an address book stored in the internal memory or other integrated storage of the recipient client device 120. The embodiments are not limited to these examples. The messaging component 740 may update an address book entry for the contact for the address book for the recipient client device 120 with the updated phone number in response to the contact phone number update 715.

In some cases, as may be determined by user settings, the messaging component 740 may reject messages associated with phone numbers not in the address book for the recipient client device 120. Alternatively, in some embodiments, the messaging system 110 may track the address book for the recipient client device 120 and reject messages associated with phone numbers not in the address book for the recipient client device 120. As such, the contact update system 100, at either the messaging system 110 or the messaging component 740, may whitelist a contact message from the contact for delivery to the messaging client on the recipient client device 120 based on the entry book entry being updated with the updated phone number.

In some cases, the contact may be part of the membership of a group thread, with the existing message thread comprising a group thread. In some embodiments, group membership may be maintained by the messaging system 110 and the messaging system 110 may update group membership in the group thread from the previous phone number to the updated phone number in response to the phone number update command 725. In other embodiments, group membership may be maintained by the clients devices and the messaging component 740 may update group membership in the group thread from the previous phone number to the updated phone number in response to the contact phone number update 715.

Figure 8:
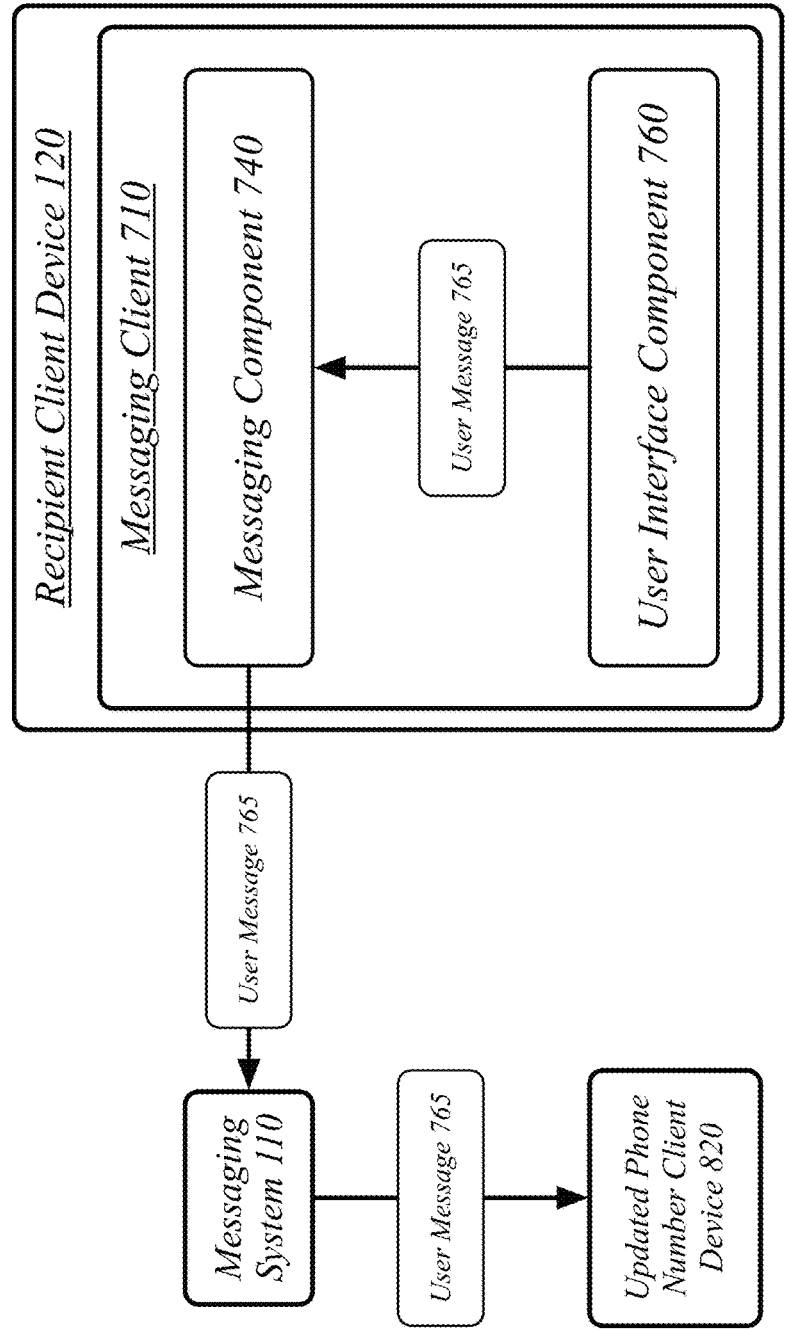
FIG. 8 illustrates an embodiment of a recipient client device configuring and sending a user message after a contact phone number update.

FIG. 8 illustrates an embodiment of a recipient client device 120 configuring and sending a user message 765 after a contact phone number update 715.

The user of the recipient client device 120 may compose a user message 765 using the user interface component 760 of the messaging client 710. In some embodiments, the user interface component 760 may receive the user message 765 from the user in association with an existing message thread. In other embodiments, the user interface component 760 may receive the user message 765 from the user in association with a replacement message thread.

The user interface component 760 may provide the user message 765 to the messaging component 740. The messaging component 740 may send the user message 765 to the contact via the messaging system 110 using the updated phone number as a destination address. The messaging component 740 may send the user message 765 encapsulated in a message package corresponding to a messaging format for the messaging system 110.

The messaging system 110 may send the user message 765 to an updated phone number client device 820 for the contact. Where the user is switching devices when switching phone numbers, the messaging system 110 sends the user message 765 to the replacement device instead of the previous phone number client device 720 used to send the phone number update command 725 to the messaging system 110. Where the user is keeping the same device and changing the phone number for the device, the updated phone number client device 820 may be a same device as the previous phone number client device 720.

Where a replacement message thread is used, the user interface component 760 may redirect the user from using the existing message thread for a contact to the replacement message thread when the user composes a reply. The user interface component 760 may receive a user selection of the existing message thread and receive a user reply command in association with the existing message thread. The user interface component 760 may redirect a user interface for the messaging client 710 to the replacement message thread in response to the user reply command. In some cases, a user reply command may correspond to a user selecting a message reply control 620 from contextual controls 610 for the messaging client 710. In other cases, the user reply command may correspond to a user entering text in a text entry area, or the user selecting a text entry area, for the existing message thread. Where the user reply command is associated with an existing message in the existing message thread—such as where the user reply command corresponds to a user selecting a message reply control 620 from contextual controls 610—the user interface component 760 may represent at least a portion of the existing message in the user interface for the replacement message thread.

Figure 9:
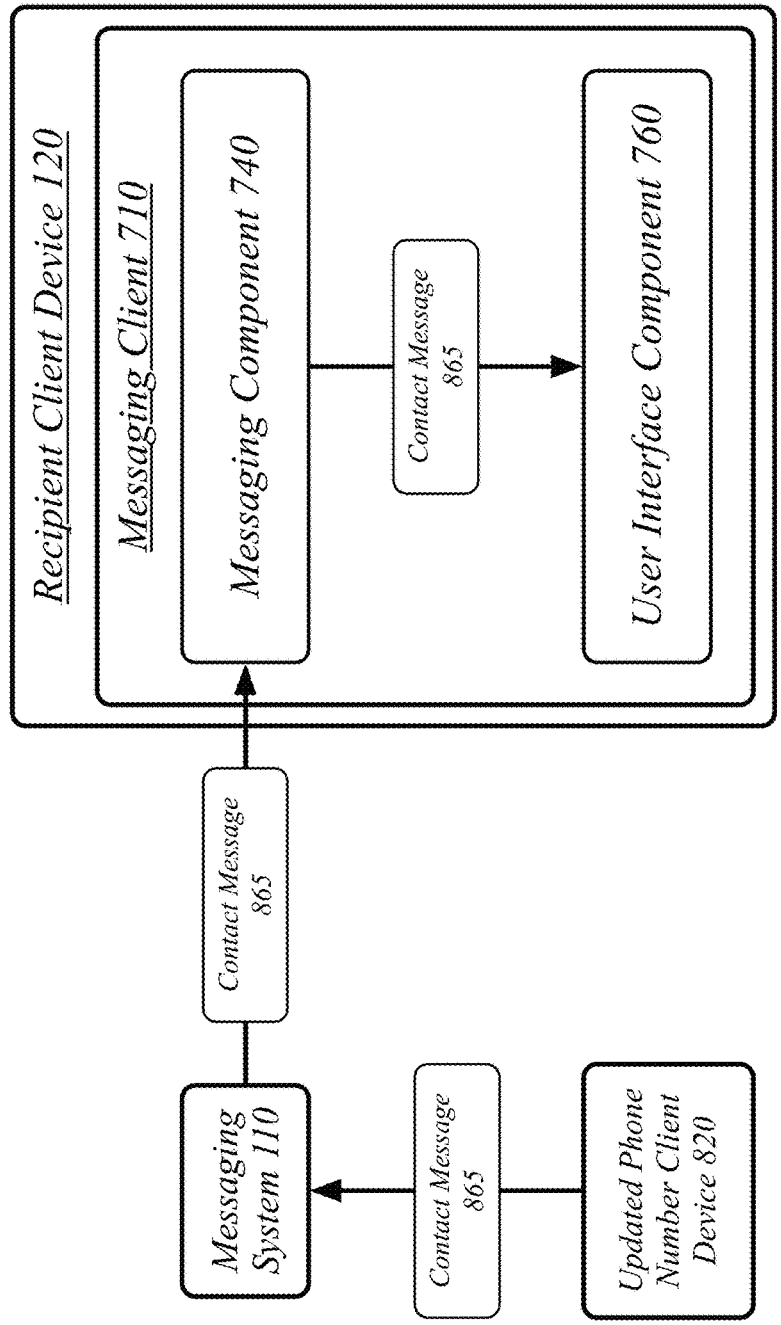
FIG. 9 illustrates an embodiment of a recipient client device receiving and processing a contact message after a contact phone number update.

FIG. 9 illustrates an embodiment of a recipient client device 120 receiving and processing a contact message 865 after a contact phone number update 745.

The user of the updated phone number client device 820 for the contact may compose a contact message 865 and send the contact message to the messaging system 110. The messaging system 110 may receive the contact message 865 and send it to the recipient client device 120 based on the contact message 865 being addressed to a phone number for the recipient client device 120. The contact message 865 may be encapsulated in a contact message package.

Where an existing message thread is reused with the updated phone number, the messaging component 740 may update the existing message thread to be identified based on the updated phone number in a message thread repository for the messaging client 710 on the recipient client device 120. The messaging component 740 may receive the contact message 865 from the contact via the messaging system 110 from a contact client device associated with the updated phone number, such as the updated phone number client device 820. The messaging component 740 may extract the contact message 865 from a contact message package and pass the contact message 865 to the user interface component 760. The user interface component 760 may display the contact message 865 in the existing message thread.

Where a replacement message thread is used with the updated phone number, the messaging component 470 may instantiate the replacement message thread in response to the contact phone number update 715, in response to a contact message 865 from the contact, or in response to a user request to message the contact, such as by selecting a previous message thread. The messaging component 470 may instantiate a replacement message thread for the existing message thread, wherein the existing message thread is identified based on the previous phone number, wherein the replacement message thread is identified based on the updated phone number. The messaging component 470 may receive a contact message 865 from the contact via the messaging system 110 from a contact client device associated with the updated phone number, such as the updated phone number client device 820. The messaging component 470 may pass the contact message to the user interface component 760, such as after extracting it from a contact message package. The user interface component 760 may display the contact message 865 in the replacement message thread.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may receive a contact phone number update at a messaging client on a client device from a messaging system, the contact phone number update associated with a contact with the messaging client, the contact phone number update comprising a previous phone number and an updated phone number at block 1002.

The logic flow 1000 may determine an existing message thread for the messaging client identified based on the previous phone number at block 1004.

The logic flow 1000 may display a contact phone number change notification in the existing message thread at block 1006.

The logic flow 1000 may receive a user message for the contact at block 1008.

The logic flow 1000 may send the user message to the contact via the messaging system using the updated phone number as a destination address at block 1010.

The embodiments are not limited to this example.

Figure 11:
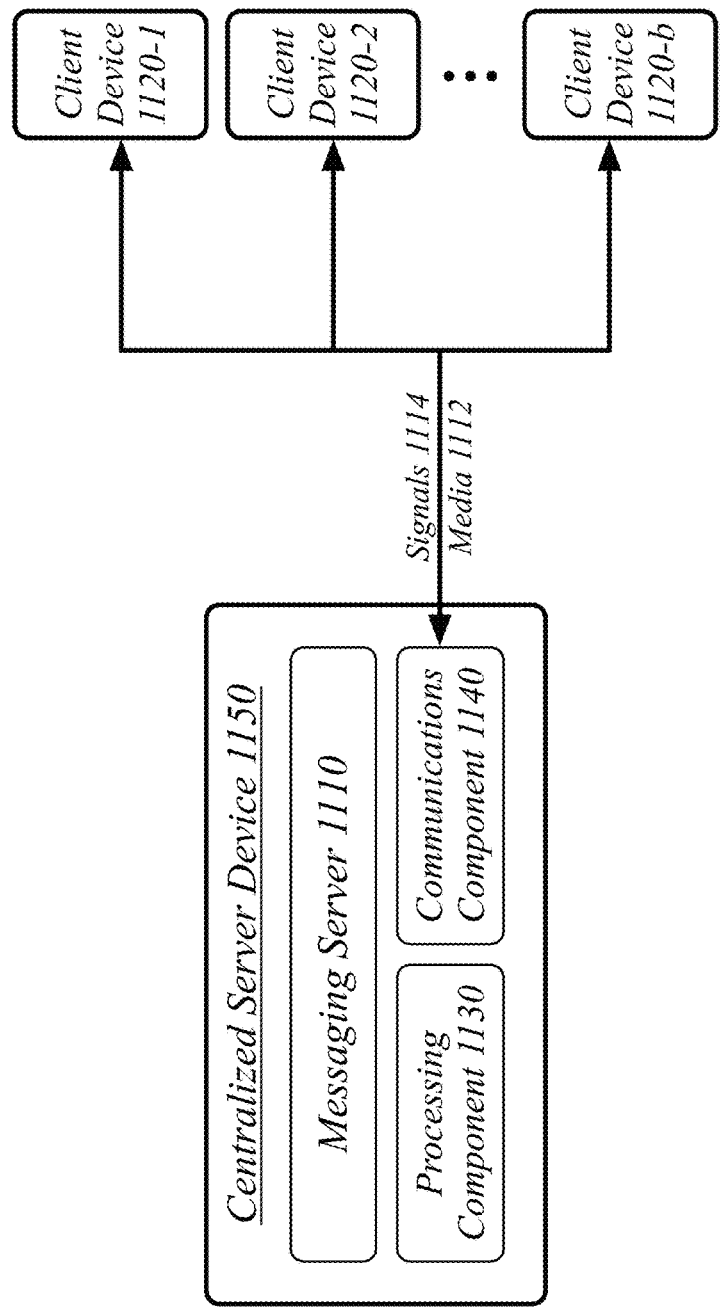
FIG. 11 illustrates an embodiment of a centralized system for the system of FIG. 1.

FIG. 11 illustrates a block diagram of a centralized system 1100. The centralized system 1100 may implement some or all of the structure and/or operations for the contact update system 100 in a single computing entity, such as entirely within a single centralized server device 1150.

The centralized server device 1150 may comprise any electronic device capable of receiving, processing, and sending information for the contact update system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 1150 may execute processing operations or logic for the contact update system 100 using a processing component 1130. The processing component 1130 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 1150 may execute communications operations or logic for the contact update system 100 using communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1112 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 1150 may implement a messaging server 1110. The messaging server 1110 may implement some or all of the messaging system 110. The messaging server 1110 may correspond to one or more of the servers discussed with reference to FIG. 2. The centralized server device 1150 may communicate with client device 1120 over a communications media 1112 using communications signals 1114 via the communications component 1140. The client devices 1120 may correspond to the recipient client device 120, the upgrading user first client device 140, the upgrading user second client device 145, the previous phone number client device 720, the updated phone number client device 820, and one or more other client devices operating with the messaging system 110.

Figure 12:
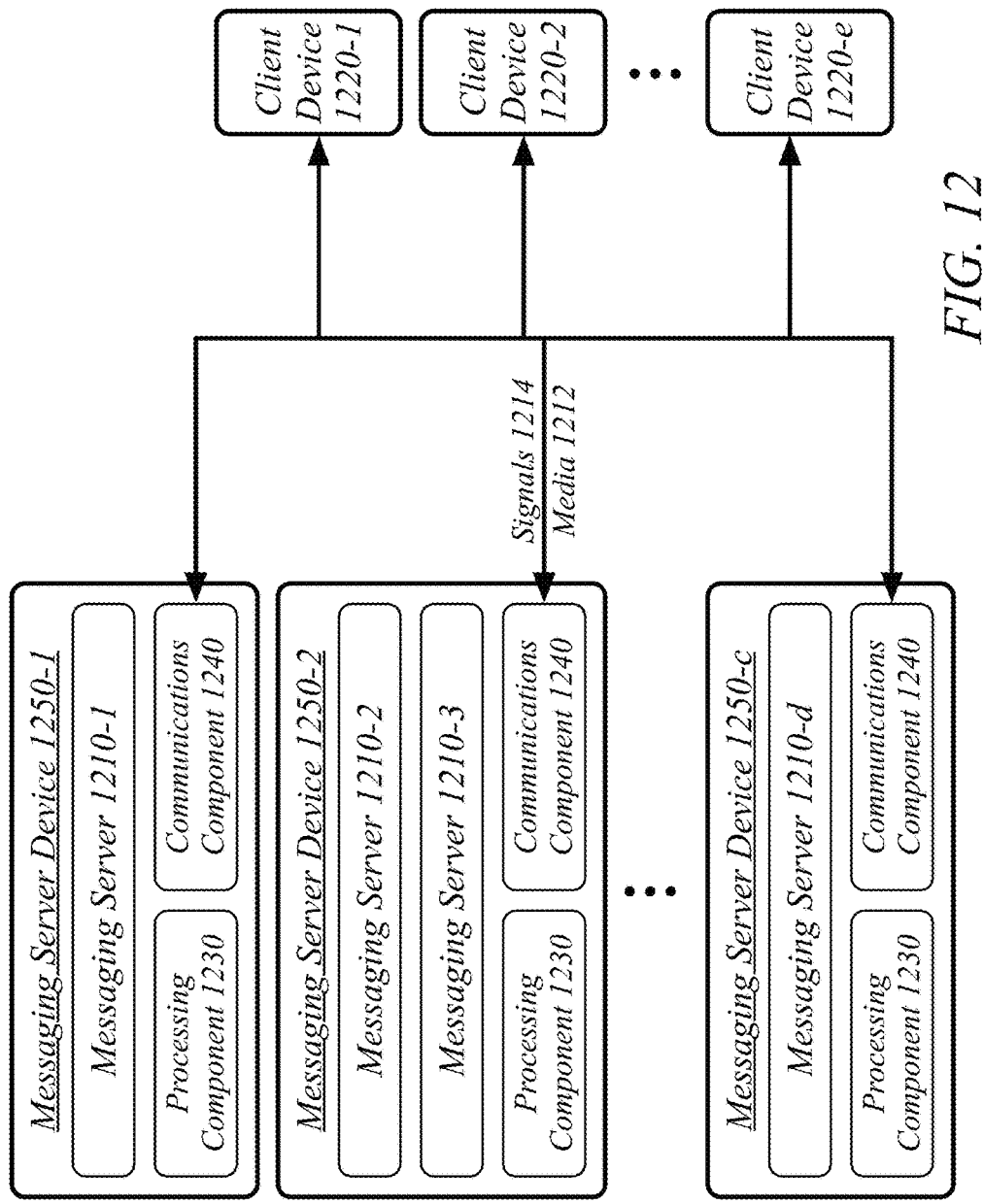
FIG. 12 illustrates an embodiment of a distributed system for the system of FIG. 1.

FIG. 12 illustrates a block diagram of a distributed system 1200. The distributed system 1200 may distribute portions of the structure and/or operations for the contact update system 100 across multiple computing entities. Examples of distributed system 1200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1200 may comprise a plurality of messaging server devices 1250. In general, the server devices 1250 may be the same or similar to the centralized server device 1150 as described with reference to FIG. 11. For instance, the server devices 1250 may each comprise a processing component 1230 and a communications component 1240 which are the same or similar to the processing component 830 and the communications component 840, respectively, as described with reference to FIG. 8. In another example, the server devices 1250 may communicate over a communications media 1212 using communications signals 1214 via the communications components 1240.

The plurality of messaging server devices 1250 may comprise or employ one or more server programs that operate to perform various methodologies in accordance with the described embodiments. In one embodiment, for example, the plurality of messaging server devices 1250 may each implement one or more messaging server 1210 of a plurality of messaging servers 1210. The messaging servers 1210 may implement some or all of the messaging system 110. The messaging servers 1210 may correspond to one or more of the servers discussed with reference to FIG. 2. The plurality of messaging server devices 1250 may communicate with a plurality of client devices 1220 using signals 1214 sent over media 1212. The client devices 1220 may correspond to the recipient client device 120, the upgrading user first client device 140, the upgrading user second client device 145, the previous phone number client device 720, the updated phone number client device 820, the client devices 1120, and one or more other client devices operating with the messaging system 110.

Figure 13:
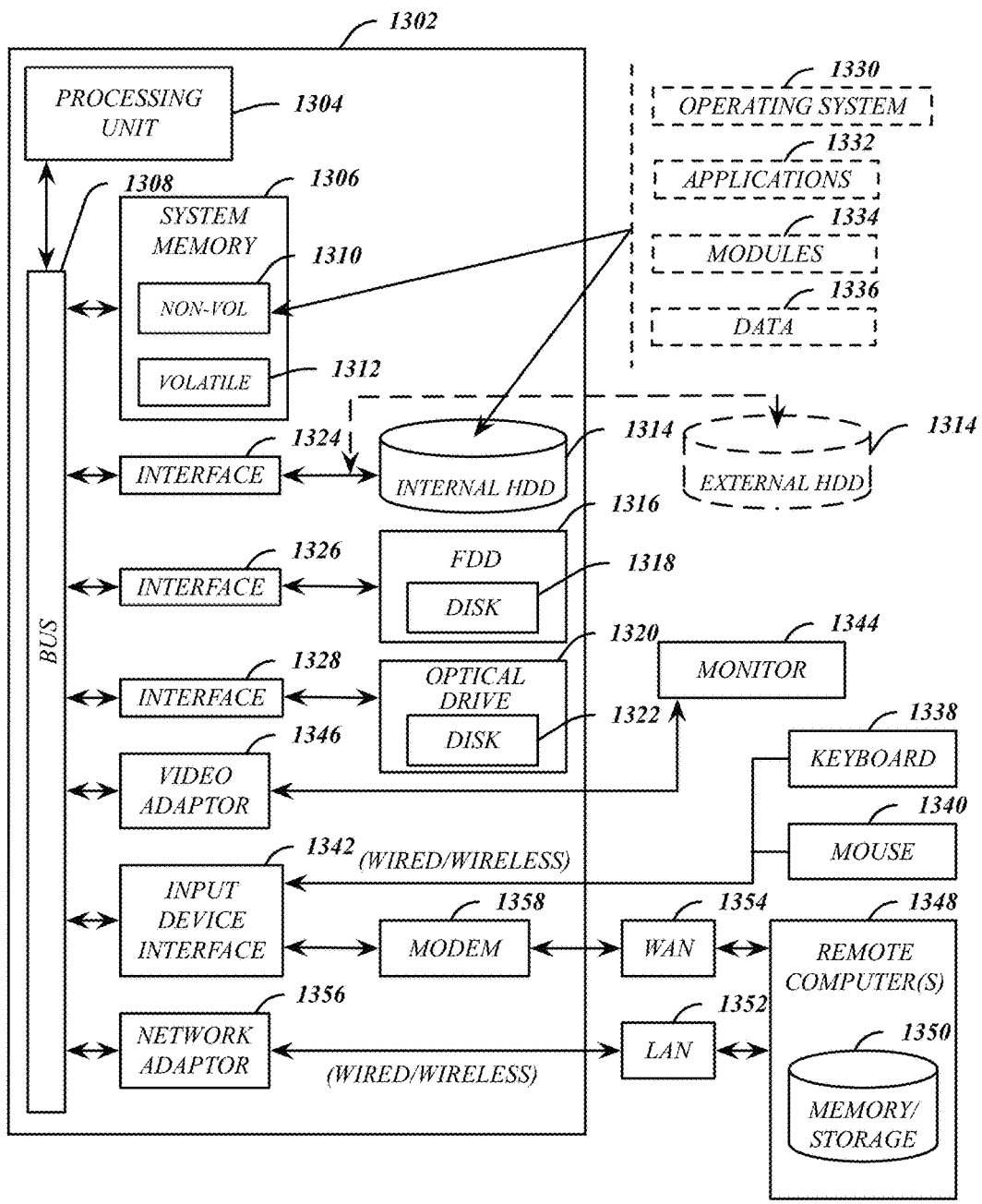
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIG. 10, 11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the contact update system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
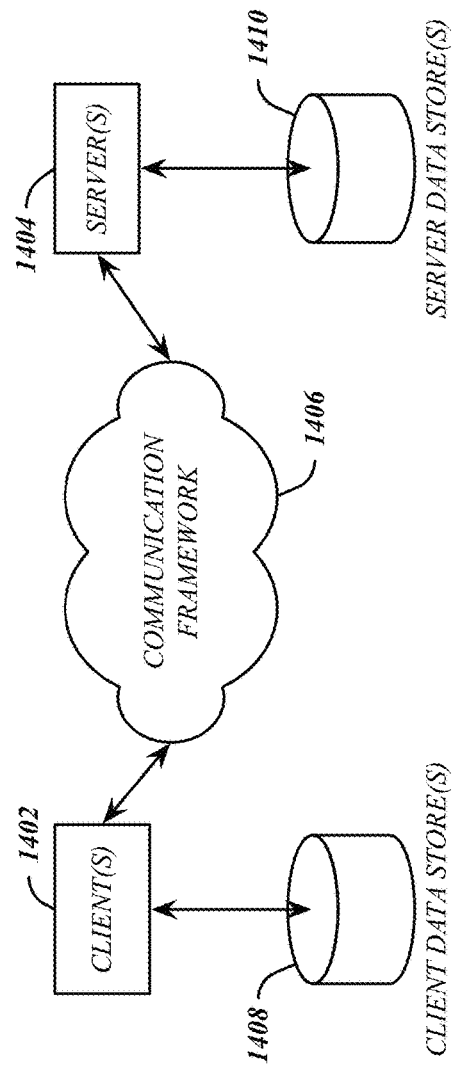
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 comprises includes one or more clients 1402 and servers 1404. The clients 1402 may implement the recipient client device 120, the upgrading user first client device 140, the upgrading user second client device 145, the previous phone number client device 720, the updated phone number client device 820, the client devices 1120, the client devices 1220, and one or more other client devices operating with the messaging system 110. The servers 1404 may implement the messaging server devices 1150, messaging server devices 1250, and one or more other server devices implementing the messaging system 110. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 15:
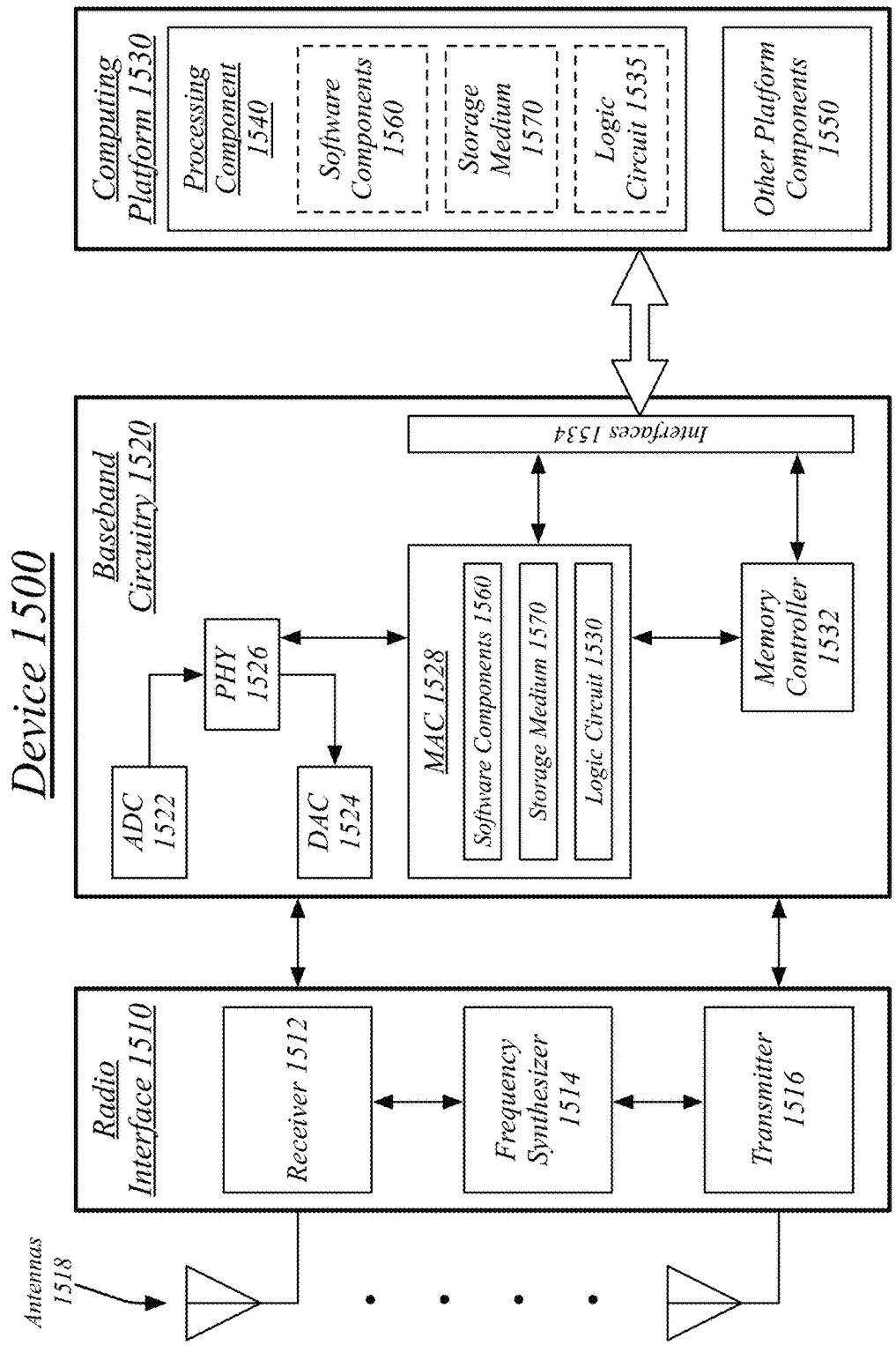
FIG. 15 illustrates an embodiment of a radio device architecture.

FIG. 15 illustrates an embodiment of a device 1500 for use in a multicarrier OFDM system, such as the contact update system 100. Device 1500 may implement, for example, software components 1560 as described with reference to contact update system 100 and/or a logic circuit 1535. The logic circuit 1535 may include physical circuits to perform operations described for the contact update system 100. As shown in FIG. 15, device 1500 may include a radio interface 1510, baseband circuitry 1520, and computing platform 1530, although embodiments are not limited to this configuration.

The device 1500 may implement some or all of the structure and/or operations for the contact update system 100 and/or logic circuit 1535 in a single computing entity, such as entirely within a single device. Alternatively, the device 1500 may distribute portions of the structure and/or operations for the contact update system 100 and/or logic circuit 1535 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1510 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1510 may include, for example, a receiver 1512, a transmitter 1516 and/or a frequency synthesizer 1514. Radio interface 1510 may include bias controls, a crystal oscillator and/or one or more antennas 1518. In another embodiment, radio interface 1510 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1520 may communicate with radio interface 1510 to process receive and/or transmit signals and may include, for example, an analog-to-digital converter 1522 for down converting received signals, a digital-to-analog converter 1524 for up converting signals for transmission. Further, baseband circuitry 1520 may include a baseband or physical layer (PHY) processing circuit 1556 for PHY link layer processing of respective receive/transmit signals. Baseband circuitry 1520 may include, for example, a processing circuit 1528 for medium access control (MAC)/data link layer processing. Baseband circuitry 1520 may include a memory controller 1532 for communicating with processing circuit 1528 and/or a computing platform 1530, for example, via one or more interfaces 1534.

In some embodiments, PHY processing circuit 1526 may include a frame construction and/or detection module, in combination with additional circuitry such as a buffer memory, to construct and/or deconstruct communication frames, such as radio frames. Alternatively or in addition, MAC processing circuit 1528 may share processing for certain of these functions or perform these processes independent of PHY processing circuit 1526. In some embodiments, MAC and PHY processing may be integrated into a single circuit.

The computing platform 1530 may provide computing functionality for the device 1500. As shown, the computing platform 1530 may include a processing component 1540. In addition to, or alternatively of, the baseband circuitry 1520, the device 1500 may execute processing operations or logic for the contact update system 100 and logic circuit 1535 using the processing component 1540. The processing component 1540 (and/or PHY 1526 and/or MAC 1528) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1530 may further include other platform components 1550. Other platform components 1550 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1500 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1500 described herein, may be included or omitted in various embodiments of device 1500, as suitably desired. In some embodiments, device 1500 may be configured to be compatible with protocols and frequencies associated one or more of the 3GPP LTE Specifications and/or IEEE 1502.16 Standards for WMANs, and/or other broadband wireless networks, cited herein, although the embodiments are not limited in this respect.

Embodiments of device 1500 may be implemented using single input single output (SISO) architectures. However, certain implementations may include multiple antennas (e.g., antennas 1518) for transmission and/or reception using adaptive antenna techniques for beamforming or spatial division multiple access (SDMA) and/or using MIMO communication techniques.

The components and features of device 1500 may be implemented using any combination of discrete circuitry, application specific integrated circuits (ASICs), logic gates and/or single chip architectures. Further, the features of device 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a contact phone number update at a messaging client on a client device from a messaging system, the contact phone number update associated with a contact with the messaging client, the contact phone number update comprising a previous phone number and an updated phone number; determining an existing message thread for the messaging client identified based on the previous phone number; displaying a contact phone number change notification in the existing message thread; receiving a user message for the contact; and sending the user message to the contact via the messaging system using the updated phone number as a destination address.

A computer-implemented method may further comprise updating the existing message thread to be identified based on the updated phone number; receiving a contact message from the contact via the messaging system from a contact client device associated with the updated phone number; and displaying the contact message in the existing message thread.

A computer-implemented method may further comprise the existing message thread comprising a group thread, further comprising: updating group membership in the group thread from the previous phone number to the updated phone number.

A computer-implemented method may further comprise receiving a contact message from the contact via the messaging system from a contact client device associated with the updated phone number; instantiating a replacement message thread for the existing message thread, wherein the existing message thread is identified based on the previous phone number, wherein the replacement message thread is identified based on the updated phone number; and displaying the contact message in the replacement message thread.

A computer-implemented method may further comprise receiving a user selection of the existing message thread; receiving a user reply command in association with the existing message thread; and redirecting a user interface for the messaging client to the replacement message thread in response to the user reply command.

A computer-implemented method may further comprise wherein the user reply command is associated with an existing message in the existing message thread, further comprising: representing at least a portion of the existing message in the user interface for the replacement message thread.

A computer-implemented method may further comprise updating an address book entry for the contact for an address book for the client device with the updated phone number.

A computer-implemented method may further comprise whitelisting a contact message from the contact for delivery to the messaging client on the client device based on the address book entry being updated with the updated phone number.

An apparatus may comprise a processor circuit on a client device; a network interface controller on the client device; a messaging component operative on the processor circuit to receive a contact phone number update using the network interface controller at a messaging client on the client device from a messaging system, the contact phone number update associated with a contact with the messaging client, the contact phone number update comprising a previous phone number and an updated phone number; determine an existing message thread for the messaging client identified based on the previous phone number; and send a user message to the contact using the network interface controller via the messaging system using the updated phone number as a destination address; and a user interface component operative on the processor circuit to display a contact phone number change notification in the existing message thread; and receive the user message for the contact. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a contact phone number update at a messaging client on a client device from a messaging system, the contact phone number update associated with a contact participating in an existing message thread in the messaging client, the contact phone number update comprising a previous phone number and an updated phone number;
determining the existing message thread by determining if a participant in the message thread is identified by a phone number matching the previous phone number in the received contact phone number update;
displaying a contact phone number change notification in the existing message thread;
receiving a user message for the contact; and
sending the user message to the contact via the messaging system using the updated phone number as a destination address.

2. The method of claim 1, further comprising:
updating the existing message thread to be identified based on the updated phone number;
receiving a contact message from the contact via the messaging system from a contact client device associated with the updated phone number; and
displaying the contact message in the existing message thread.

3. The method of claim 1, the existing message thread comprising a group thread, further comprising:
updating group membership in the group thread from the previous phone number to the updated phone number.

4. The method of claim 1, further comprising:
receiving a contact message from the contact via the messaging system from a contact client device associated with the updated phone number;
instantiating a replacement message thread for the existing message thread, wherein the existing message thread is identified based on the previous phone number, wherein the replacement message thread is identified based on the updated phone number; and displaying the contact message in the replacement message thread.

5. The method of claim 4, further comprising:
receiving a user selection of the existing message thread;
receiving a user reply command in association with the existing message thread; and
redirecting a user interface for the messaging client to the replacement message thread in response to the user reply command.

6. The method of claim 5, wherein the user reply command is associated with an existing message in the existing message thread, further comprising:
representing at least a portion of the existing message in the user interface for the replacement message thread.

7. The method of claim 1, further comprising:
updating an address book entry for the contact for an address book for the client device with the updated phone number.

8. The method of claim 7, further comprising:
whitelisting a contact message from the contact for delivery to the messaging client on the client device based on the address book entry being updated with the updated phone number.

9. An apparatus, comprising:
a processor circuit on a client device;
a network interface controller on the client device;
a messaging component operative on the processor circuit to:
receive a contact phone number update via the network interface controller at a messaging client on the client device from a messaging system, the contact phone number update associated with a contact participating in a message thread in the messaging client, the contact phone number update comprising a previous phone number and an updated phone number;
determine the existing message thread by determining if a participant in the message thread is identified by a phone number matching the previous phone number in the received phone number update; and
send a user message to the contact using the network interface controller via the messaging system using the updated phone number as a destination address; and
a user interface component operative on the processor circuit to:
display a contact phone number change notification in the existing message thread; and
receive the user message for the contact.

10. The apparatus of claim 9, further comprising:
the messaging component operative to update the existing message thread to be identified based on the updated phone number; and receive a contact message from the contact via the messaging system from a contact client device associated with the updated phone number; and
the user interface component operative to display the contact message in the existing message thread.

11. The apparatus of claim 9, the existing message thread comprising a group thread, further comprising:
the messaging component operative to update group membership in the group thread from the previous phone number to the updated phone number.

12. The apparatus of claim 9, further comprising:
the messaging component operative to receive a contact message from the contact via the messaging system from a contact client device associated with the updated phone number; and instantiate a replacement message thread for the existing message thread, wherein the existing message thread is identified based on the previous phone number, wherein the replacement message thread is identified based on the updated phone number; and
the user interface component operative to display the contact message in the replacement message thread.

13. The apparatus of claim 12, further comprising:
the user interface component operative to receive a user selection of the existing message thread; receive a user reply command in association with the existing message thread; and redirect a user interface for the messaging client to the replacement message thread in response to the user reply command.

14. The apparatus of claim 9, further comprising:
the messaging component operative to update an address book entry for the contact for an address book for the client device with the updated phone number.

15. A non-transitory computer-readable storage medium comprising instructions that, when executed, cause a system to:
receive a contact phone number update at a messaging client on a client device from a messaging system, the contact phone number update associated with a contact participating in an existing message thread in the messaging client, the contact phone number update comprising a previous phone number and an updated phone number;
determine the existing message thread by determining if a participant in the message thread is identified by a phone number matching the previous phone number in the received phone number update;
display a contact phone number change notification in the existing message thread;
receive a user message for the contact; and
send the user message to the contact via the messaging system using the updated phone number as a destination address.

16. The computer-readable storage medium of claim 15, comprising further instructions that, when executed, cause a system to:
update the existing message thread to be identified based on the updated phone number;
receive a contact message from the contact via the messaging system from a contact client device associated with the updated phone number; and
display the contact message in the existing message thread.

17. The computer-readable storage medium of claim 15, the existing message thread comprising a group thread, comprising further instructions that, when executed, cause a system to:
update group membership in the group thread from the previous phone number to the updated phone number.

18. The computer-readable storage medium of claim 15, comprising further instructions that, when executed, cause a system to:
receive a contact message from the contact via the messaging system from a contact client device associated with the updated phone number;
instantiate a replacement message thread for the existing message thread, wherein the existing message thread is identified based on the previous phone number, wherein the replacement message thread is identified based on the updated phone number; and
display the contact message in the replacement message thread.

19. The computer-readable storage medium of claim 18, comprising further instructions that, when executed, cause a system to:
- receive a user selection of the existing message thread;
- receive a user reply command in association with the existing message thread; and
- redirect a user interface for the messaging client to the replacement message thread in response to the user reply command.

20. The computer-readable storage medium of claim 15, comprising further instructions that, when executed, cause a system to:
- update an address book entry for the contact for an address book for the client device with the updated phone number.

* * * * *